(12) United States Patent
Shan et al.

(10) Patent No.: US 12,516,224 B2
(45) Date of Patent: Jan. 6, 2026

(54) HIGHLY TUNABLE DRY ADHESION OF SOFT HOLLOW PILLARS THROUGH SIDEWALL BUCKLING UNDER LOW PRESSURE

(71) Applicants: Wanliang Shan, Jameville, NY (US); Guangchao Wan, College Station, TX (US)

(72) Inventors: Wanliang Shan, Jameville, NY (US); Guangchao Wan, College Station, TX (US)

(73) Assignee: Syracuse University, Syracuse, NY (US)

( * ) Notice: Subject to any disclaimer, the term of this patent is extended or adjusted under 35 U.S.C. 154(b) by 144 days.

(21) Appl. No.: 18/243,919

(22) Filed: Sep. 8, 2023

(65) Prior Publication Data

US 2024/0093065 A1 Mar. 21, 2024

Related U.S. Application Data

(60) Provisional application No. 63/404,644, filed on Sep. 8, 2022.

(51) Int. Cl.
*B25J 15/00* (2006.01)
*B25J 9/14* (2006.01)
*C09J 7/38* (2018.01)

(52) U.S. Cl.
CPC .............. *C09J 7/38* (2018.01); *B25J 9/142* (2013.01); *B25J 15/008* (2013.01); *C09J 2301/31* (2020.08)

(58) Field of Classification Search
CPC .............................. B25J 9/142; C09J 2301/31
See application file for complete search history.

(56) References Cited

U.S. PATENT DOCUMENTS

| | | | |
|---|---|---|---|
| 2017/0087763 A1* | 3/2017 | Turner | G03F 7/162 |
| 2019/0176342 A1* | 6/2019 | Hawkes | B25J 15/0085 |
| 2020/0023628 A1* | 1/2020 | Shan | B32B 37/12 |
| 2020/0061845 A1* | 2/2020 | Song | B25J 15/008 |

OTHER PUBLICATIONS

Nasab et al., Switchable Adhesion via Substrate Pressure Modulation, ACS Applied Materials & Interfaces, 2020, pp. 27717-27725 (published Jun. 5, 2020) (Year: 2020).*

* cited by examiner

*Primary Examiner* — Scott W Dodds
(74) *Attorney, Agent, or Firm* — David L. Nocilly; Bond Schoeneck & King PLLC

(57) ABSTRACT

An approach to achieve highly tunable adhesion using low pressure by inducing sidewall buckling in soft hollow pillars (SHPs). Dry adhesion of these SHPs can be changed by two orders of magnitude (up to 145×) using low activating pressure (~−10 kPa or ~20 kPa). Negative pressure triggers sidewall buckling while positive pressure induces sidewall bulging, both of which can significantly change stress distribution at the bottom surface to facilitate crack initiation and reduce adhesion therein. A single SHP can be activated by a micropump to manipulate various lightweight objects with different curvature and surface texture. An array of SHPs can realize selective pick-and-place of an array of objects. Minor modifications to the SHPs in terms of geometry and material (with or without cap, circular or noncircular cross section) can further enhance the adhesion tuning performance of these SHPs.

18 Claims, 29 Drawing Sheets

- $H$=6 mm, $D$=6 mm, $t$=0.8 mm, $E$=0.18 MPa
- $H$=6 mm, $D$=6 mm, $t$=1.0 mm, $E$=0.18 MPa
- $H$=6 mm, $D$=6 mm, $t$=0.8 mm, $E$=0.07 MPa
- $H$=6 mm, $D$=4 mm, $t$=0.8 mm, $E$=0.18 MPa

● $H=6$ mm, $D=6$ mm, $t=1.0$ mm, $E=0.18$ MPa     ■ $H=7.7$ mm, $D=6$ mm, $t=1.1$ mm, $E=0.18$ MPa

▲ $H=9.8$ mm, $D=6$ mm, $t=1.2$ mm, $E=0.18$ MPa

HIGHLY TUNABLE DRY ADHESION OF SOFT HOLLOW PILLARS THROUGH SIDEWALL BUCKLING UNDER LOW PRESSURE

CROSS-REFERENCE TO RELATED APPLICATIONS

The present application claims priority to U.S. Provisional Application No. 63/404,644, filed on Sep. 8, 2022, hereby incorporated by reference in its entirety.

STATEMENT REGARDING FEDERALLY SPONSORED RESEARCH OR DEVELOPMENT

This invention was made with government support under Grant No. CMMI 2006430 awarded by the National Science Foundation (NSF). The government has certain rights in the invention.

BACKGROUND OF THE INVENTION

1. Field of the Invention

The present invention relates to controllable adhesive surfaces and, more specifically to adhesive pillars having tunable adhesion using pressure changes.

2. Description of the Related Art

The ability to regulate adhesion at interfaces is important for biological functions such as gecko's climbing on a vertical wall and industrial applications such as transfer printing. The vast need motivates researchers to design switchable adhesive systems whose adhesion strength can be controlled on demand by various stimuli, including mechanical forces, magnetic field, electric current, pneumatics, light, and temperature. In particular, gecko-inspired dry adhesive surfaces with array of micropillars have been studied extensively. The adhesion mechanics of individual or array of pillars inspired by features of Gecko's feet has also been explored thoroughly in many different scenarios, such as pillars with or without a mushroom cap, homogeneous or composite pillars, tilted and noncylindrical shaped pillars, among others.

Among all existing approaches to switchable adhesion, pneumatics-controlled tunable adhesion has advantages including fast actuation, easily accessed constituent material and robust performance. Both positive and negative pressure can be utilized to switch adhesion based on a variety of mechanisms. Here, positive (negative) pressure means that pressure is higher (lower) than the atmospheric pressure. For instance, A. Carlson et al. fabricated an elastomeric stamp whose adhesion strength can decrease by 50× with positive pressure ~70 kPa applied through a subsurface pneumatic channel. More recently, Nasab et al. designed a cylindrical elastomeric device containing a mushroom-shaped cap and an annular chamber whose pressure can be manipulated and ~5× dry adhesion change can be realized with positive pressure ~50 kPa. Upon inflation, the sidewall of the device will bend and generate local high stress on the contact surface that facilitates crack initiation and thus decreases dry adhesion. For tunable adhesive systems relying on negative pressure, the suction effect is typically exploited to tune the interfacial adhesion. Although great progress has been made, the relatively high activating pressure and relatively low adhesion switching ratio still limit the application of pneumatics-controlled adhesion-based grippers in many circumstances. While low switching ratio narrows the weight range of objects that can be manipulated, high activating pressure requires bulky supporting hardware such as pumps and pipes. Many existing miniaturized pumps can only provide pressure below 20 kPa, making it hard to realize untethered small-scale pneumatics-controlled grippers based on existing designs. Besides, low-pressure actuation brings additional benefits including lower power consumption of pumps, reduced probability of air leakage, higher response speed and slower material deterioration, which can improve the energy efficiency and prolong the working life of the integrated system. Therefore, it is necessary to develop novel tunable adhesives that can achieve significant adhesion change with low pressure (ideally <20 kPa).

BRIEF SUMMARY OF THE INVENTION

The present invention comprises highly tunable adhesion using low pressure by inducing sidewall buckling in soft hollow pillars (SHPs). Dry adhesion of these SHPs can be changed by two orders of magnitude (up to 145×) using low activating pressure (~−10 kPa or ~20 kPa). Negative pressure triggers sidewall buckling while positive pressure induces sidewall bulging, both of which can significantly change stress distribution at the bottom surface to facilitate crack initiation and reduce adhesion therein. A single SHP can be activated by a micropump to manipulate various lightweight objects with different curvature and surface texture and an array of SHPs can realize selective pick-and-place of larger objects or an array of objects.

In a first aspect, the present invention may comprise a tunable dry adhesion apparatus having a sidewall extending along a predetermined cross-sectional geometry to define a hollow space therein, a bottom membrane sealing a first end of the hollow space of the cylindrical sidewall, and a source of pressure coupled to an opposing end of the sidewall from the bottom membrane that is configured to apply an activating pressure and a deactivating pressure to the hollow space. The sidewall and the bottom membrane may be formed from a silicone elastomer. The elastomer may be a material selected from the group consisting of vinylpolysiloxane and silicone rubber. The bottom membrane may extend beyond the sidewall. The predetermined cross-sectional geometry may comprise a circle. The diameter of the circle may be between 4 and 8 millimeters, inclusively, the sidewall has a thickness of between 0.6 and 1.2 millimeters, inclusively, and the sidewall has a height of between 9 and 9.8 millimeters, inclusively. The geometry may also be scaled up or down as desired. The predetermined cross-sectional geometry may comprise an ellipse. The ellipse may have an elliptical ratio of between 0.3 and 1.0, inclusively.

In another aspect, the present invention may comprise a method of adhering to a target object including the step of providing a dry adhesion apparatus having a sidewall extending along a predetermined cross-sectional geometry to define a hollow space therein, a bottom membrane sealing a first end of the hollow space of the cylindrical sidewall, and a source of pressure coupled to an opposing end of the sidewall from the bottom membrane that is configured to apply an activating pressure and a deactivating pressure to the hollow space. Another step involves moving the dry adhesion apparatus so that the bottom membrane contacts the target object. A further step involves actuating the source of pressure to apply an activating pressure to the hollow space. The activating pressure may be a positive pressure. The activating pressure may be a negative pressure. The sidewall and the bottom membrane may be formed from a silicone elastomer. The elastomer may be a material selected from the group consisting of vinylpolysiloxane and silicone rubber. The bottom membrane may extend beyond the sidewall. The predetermined cross-sectional geometry may be a circle or an ellipse.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is (a) Working principle of the SHP in pick-and-release of objects using negative (first row) or positive (second row) pressure. A 3D printed item with a polished surface is used as an example object. The scale bar is 3 mm. (b) The adhesion strength of the SHP, σ, against a glass substrate under various internal pressure p. (c) Comparison of the activating pressure $p_{cr}$ and the switching ratio between this work and other studies. (d) Comparison of the activating pressure $p_{cr}$ and the maximum adhesion strength $\sigma_m$ of this work and other studies. Eight SHPs with different geometries and materials have been made and tested under negative pressure regime, as shown here. (e) Schematic illustration of the underlying mechanism for reduced adhesion strength of the SHPs under negative or (f) positive pressure.

FIG. 2 is (a) Schematic illustrations of the FE model and the linear traction-separation behavior used in FEM. Along the normal direction, $\tau_m$=0.02 MPa, $\delta_e$=0.002 mm, $\delta_m$=0.004 mm. (b) Simulation results of the position of the crack tip when pressure is 4 kPa or 18 kPa. (c) Simulation results of the distribution of the normal and shear stress along the interface when pressure is 4 kPa, (e) 12 kPa and (g) 18 kPa. (d) The contact area evolution during retraction in adhesion experiments when pressure is 4 kPa, (f) 12 kPa and (h) 18 kPa.

FIG. 3 is (a) The deformation of the SHP from simulation and experiment when the negative pressure is −4 kPa and (c) −8 kPa. The scale bars are 1 mm. (b) The evolution of the contact area during the retraction process from simulation and experiment when the negative pressure is −4 kPa and (d) −8 kPa.

FIG. 4 is (a) Schematic illustration of the soft hollow pillar's geometry and its simplified mechanical model. (b) The relationship between the critical pressure $p_{cr}$ and the dimensionless parameter η. The dashed line is the fitting curve from Equation (1). (c) Phase diagram regarding the buckling mode of the SHPs. The samples for the experimental and simulations results shown on the right-hand side have the geometric parameters as H=6 mm, D=8 mm, t=0.8 mm, a=1.06 mm when n=3 and H=10 mm, D=6 mm, t=0.8 mm, a=0.8 mm when n=2 (the scale bars are 3 mm). (d) Dependence of the adhesion strength $\sigma_0$ on the sidewall thickness t predicted by FEM. The other parameters are D=H=6 mm, a=0.8 mm. (e) Dependence of the adhesion strength $\sigma_0$ on the diameter D. The other parameters are H=6 mm, a=t=0.8 mm. (f) Dependence of the adhesion strength $\sigma_0$ on the modulus E. The other parameters are D=H=6 mm, a=t=0.8 mm.

Figure 9:
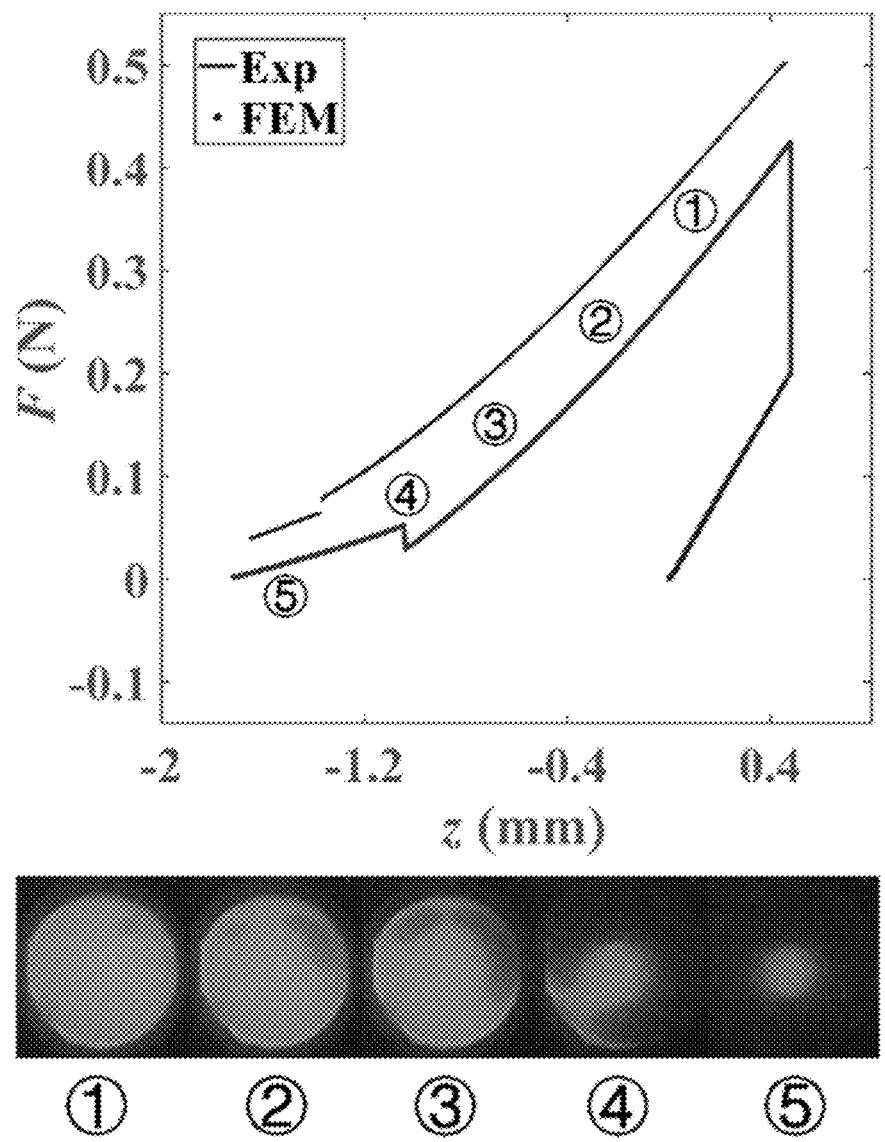

FIG. 9 is a graph of the typical force-displacement curve during adhesion characterization test from experiments and simulations. The internal positive pressure is 18 kPa here. The snapshots are the contact area evolution during the retraction process.

Figure 10:
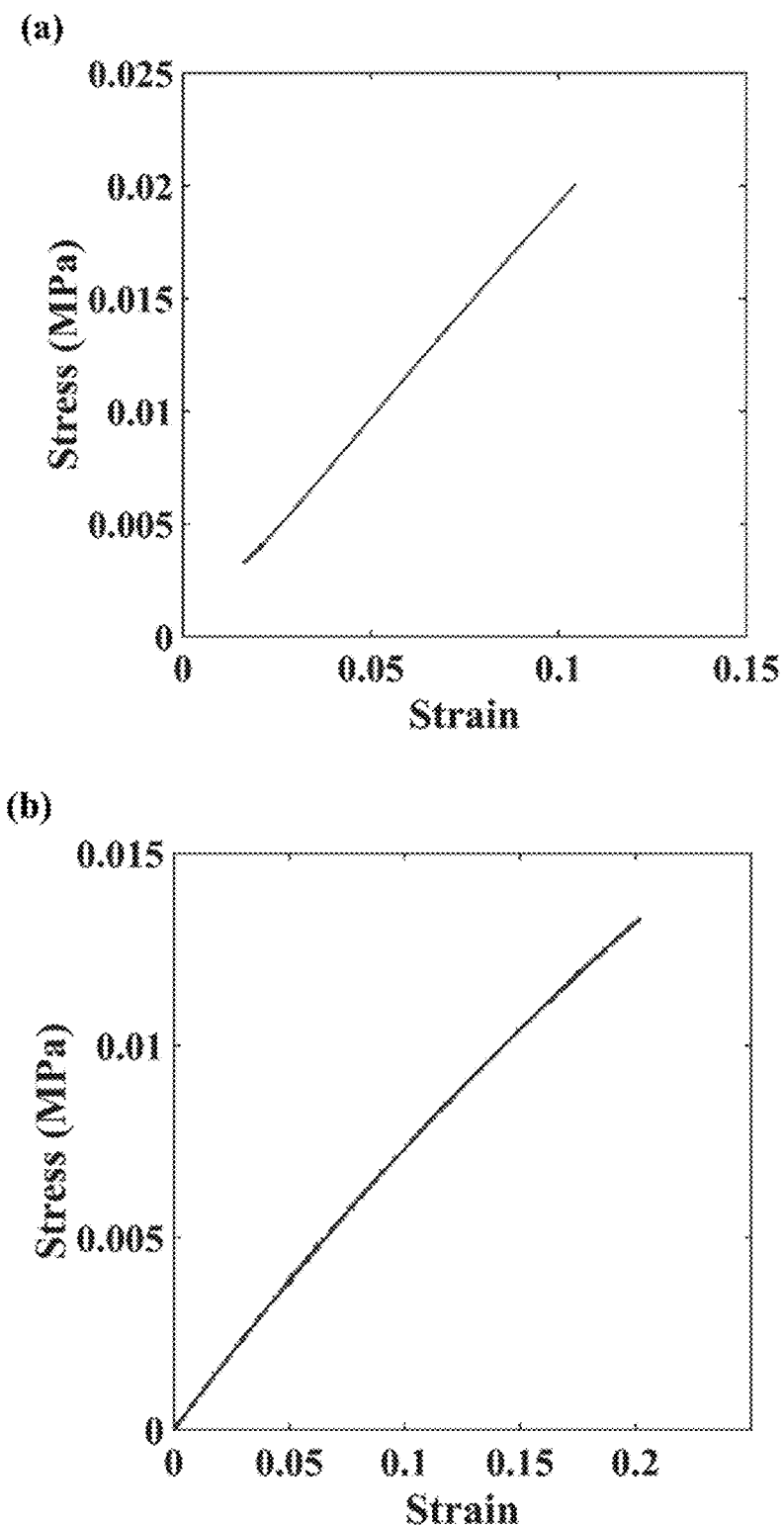

FIG. 10 is a pair of graphs of the stress-strain curve of (a) VPS (Elite Double 8) and (b) EcoFlex-30 samples in uniaxial tensile testing.

Figure 11:
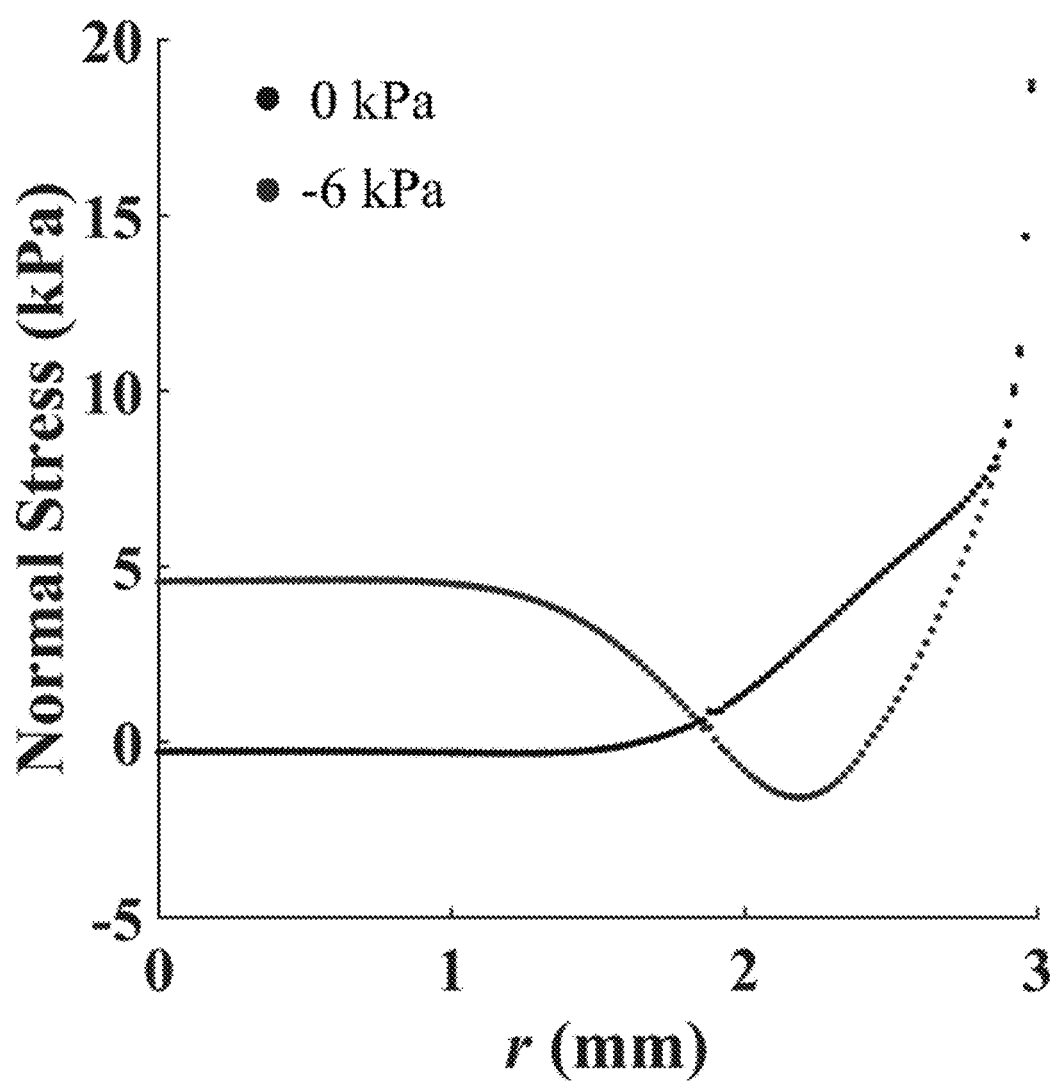

FIG. 11 is a graph of the distribution of the normal contact stress right before crack initiation when the internal pressure is 0 kPa and −6 kPa.

Figure 12:
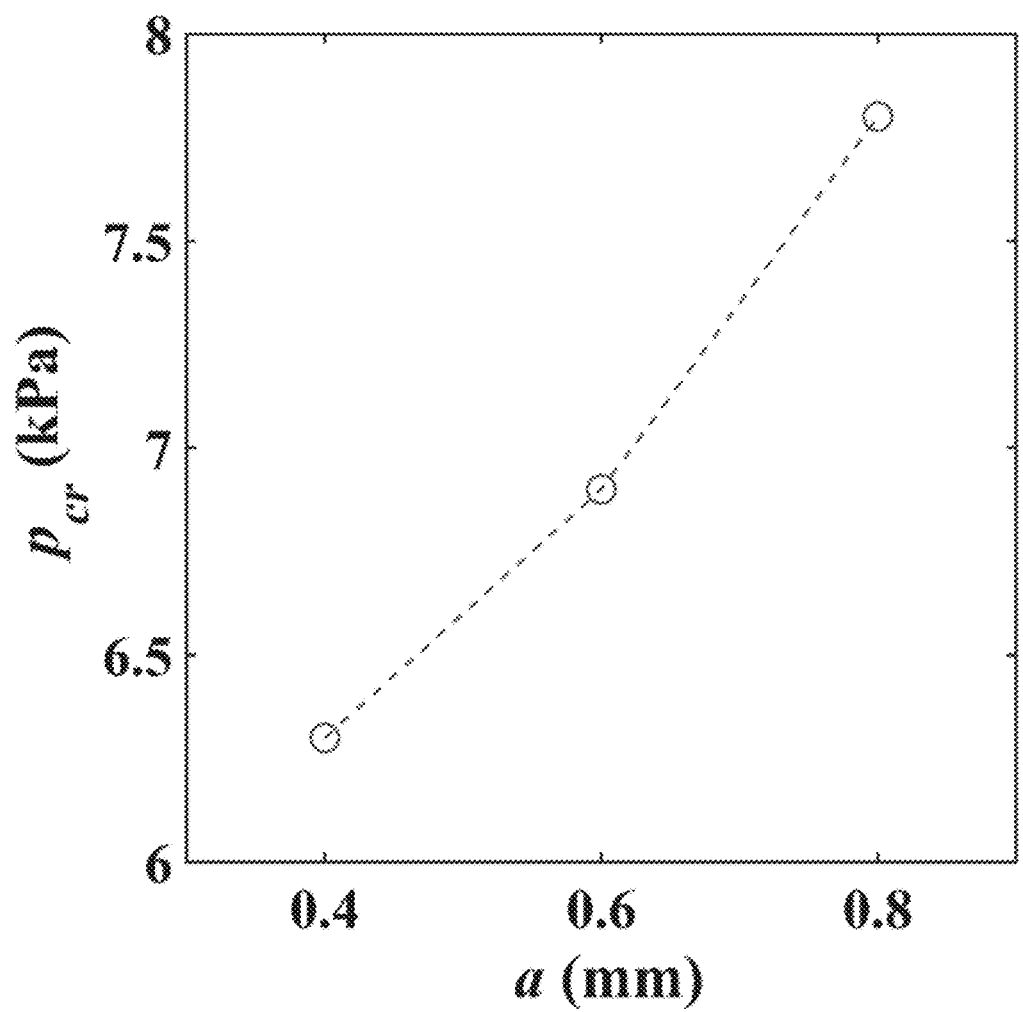

FIG. 12 is a graph of the variation of the critical buckling pressure $p_{cr}$ versus the bottom thickness a. The other geometric parameters are H=D=6 mm, t=0.8 mm.

Figure 13:
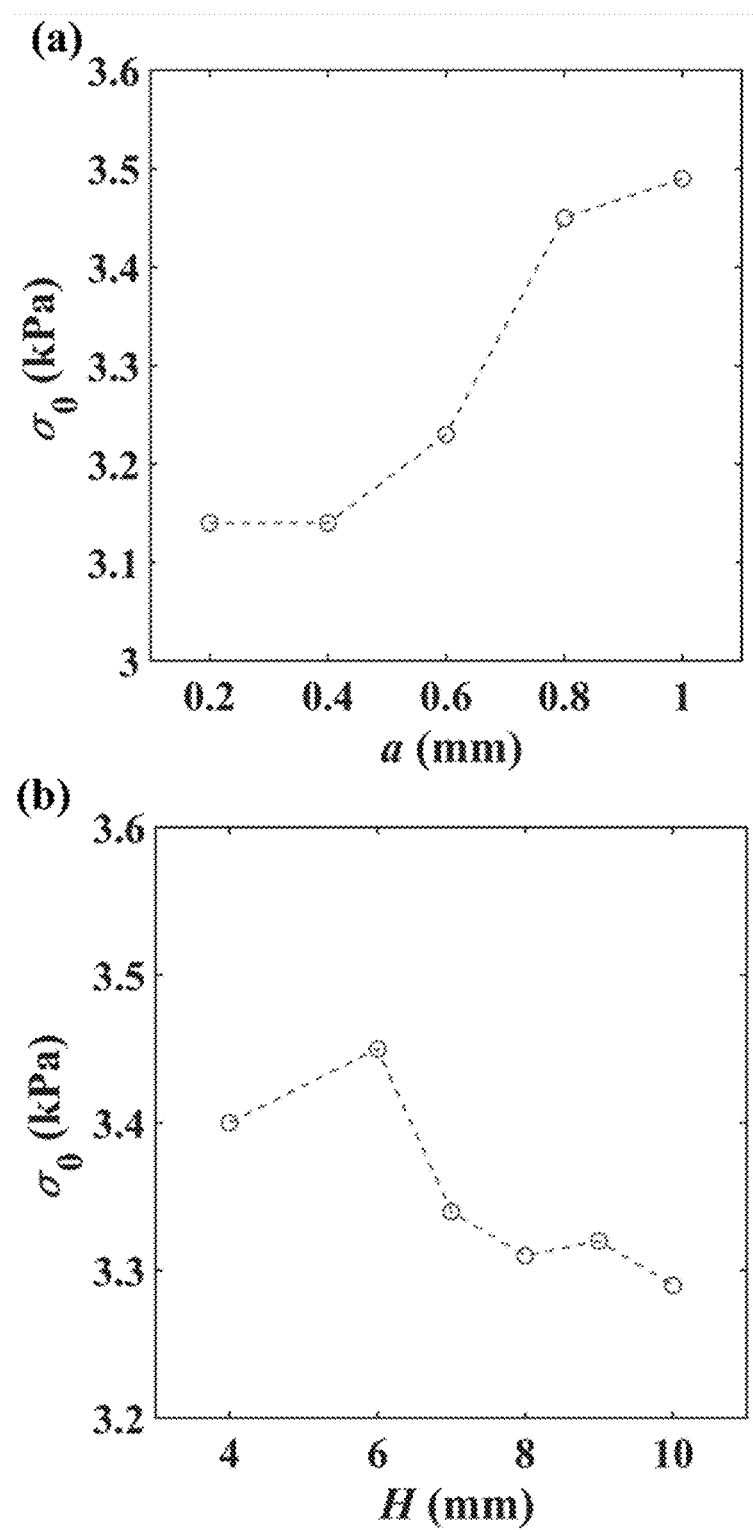

FIG. 13 is a pair of graphs of (a) The variation of the adhesion strength $\sigma_0$ versus the thickness of the contact membrane a. The other geometric parameters are H=D=6 mm, t=0.8 mm. (b) The variation of the adhesion strength $\sigma_0$ versus the height of the adhesive H. The other geometric parameters are D=6 mm, a=t=0.8 mm.

Figure 14:
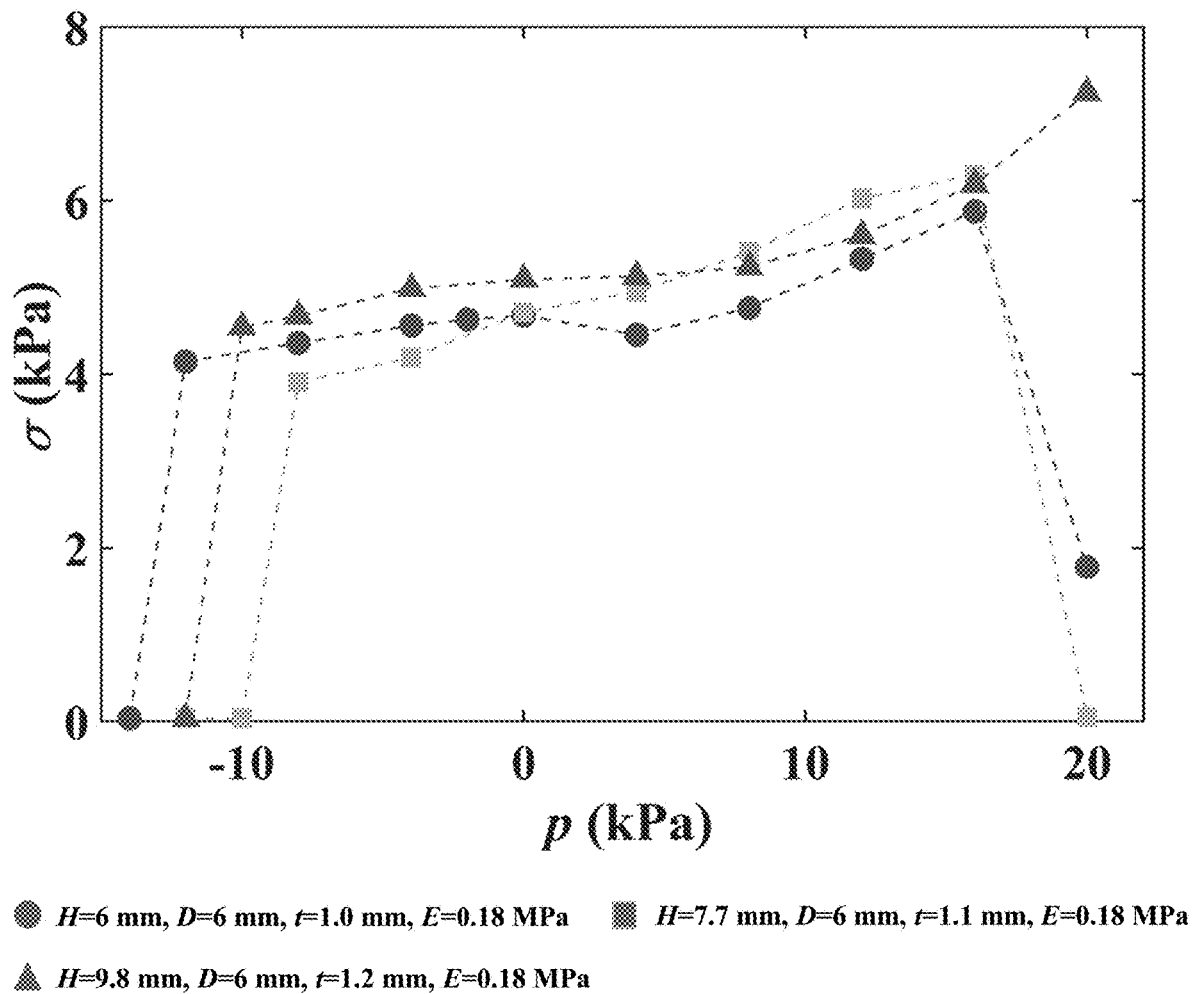

FIG. 14 is a graph of the variation of the adhesion strength versus the internal pressure for three SHPs made of VPS with the same η=0.016. The thickness of the sidewall t increases from 1.0 mm to 1.2 mm.

Figure 15:
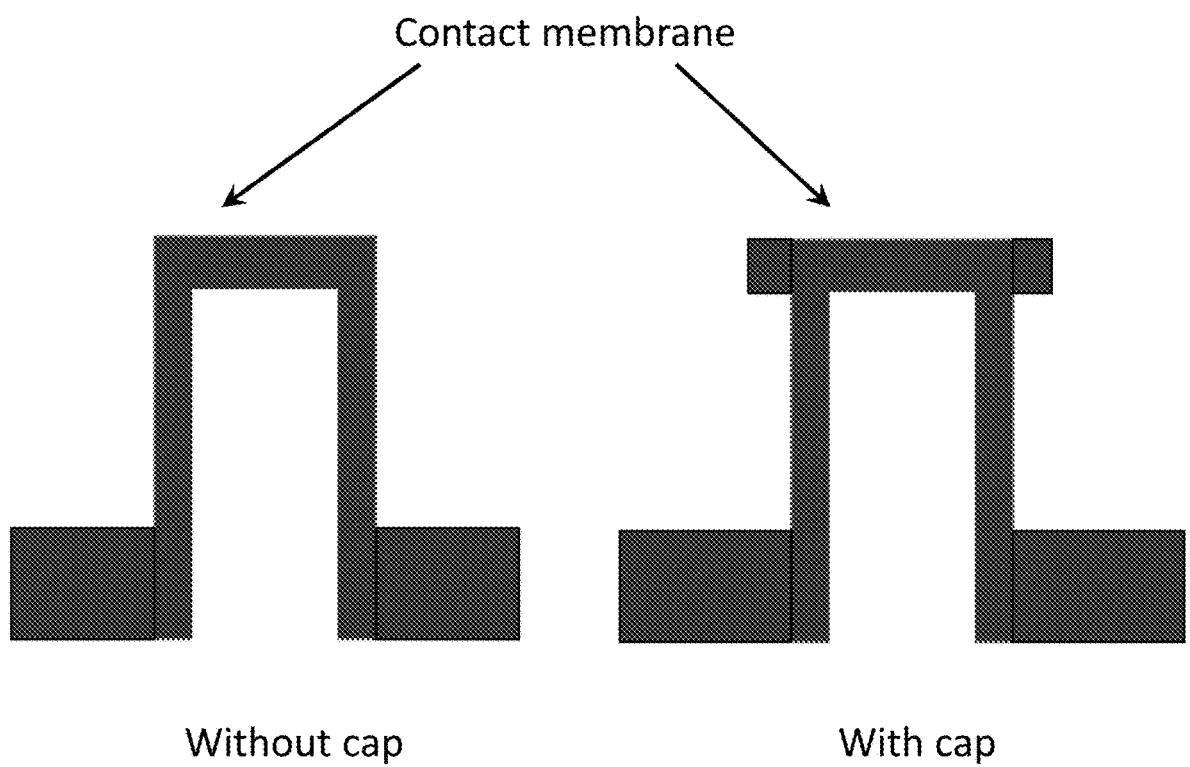

FIG. 15 is a schematic showing alternative embodiments of the contact membrane of the invention.

Figure 16:
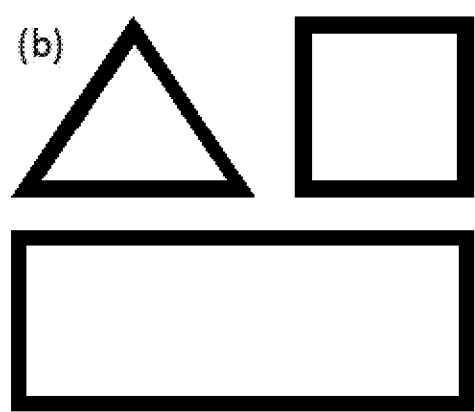

FIG. 16 is a set of schematics showing (a) A SHP of circular contact geometry and its working mechanism for tunable dry adhesion under positive and negative pressure. (b) Alternative cross-section geometries for the pillars of the present invention (circular, elliptical, square, and rectangular), and summary of their interfacial delamination behaviors in comparison with circular SHPs under negative and positive pressure.

Figure 17:
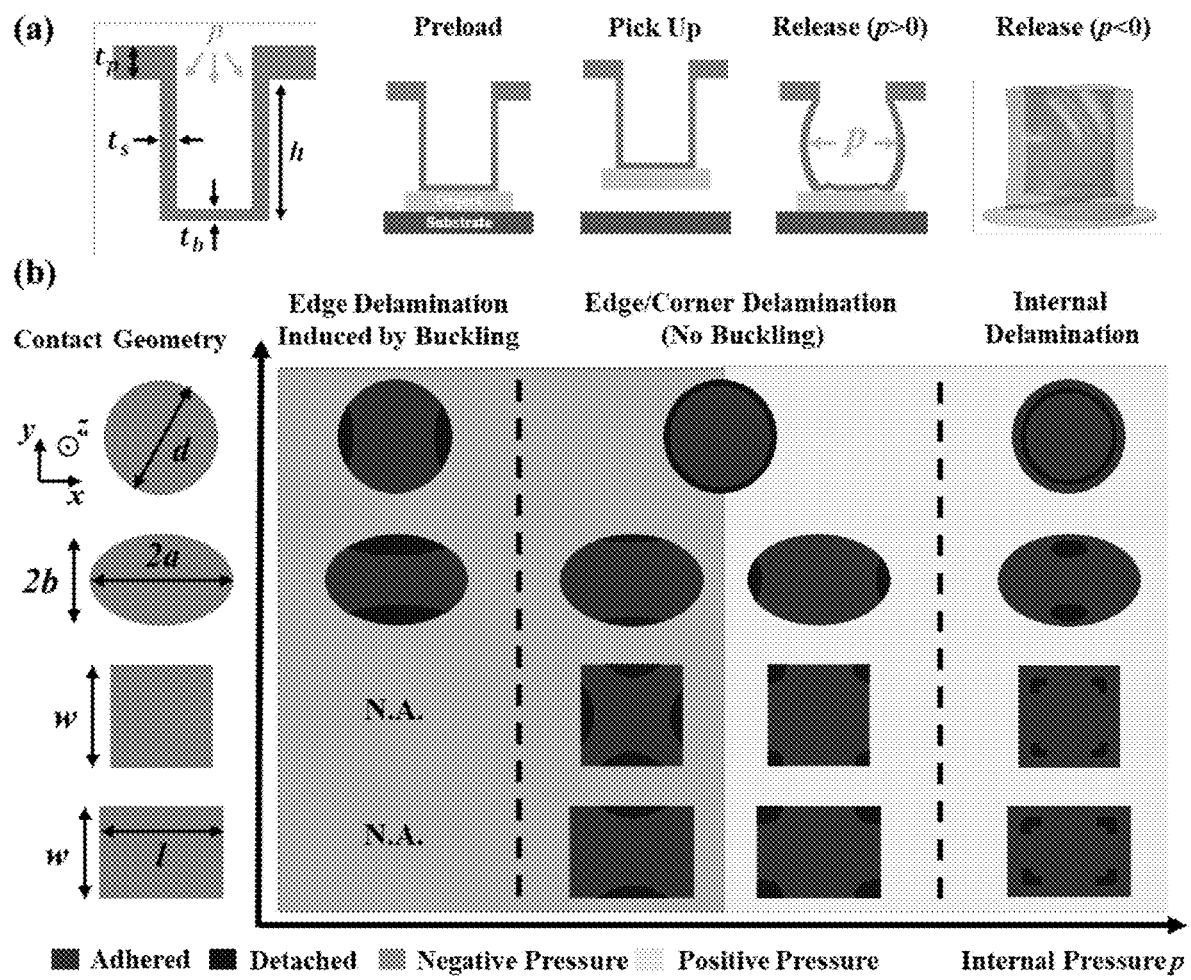

FIG. 17 is a set of schematics and images including (a) Schematic illustration of the mold-casting fabrication of SHPs with different contact geometries. (b) Schematics and photo of experimental setup for measuring adhesive force and capturing contact area evolution of a SHP. (c) Geometric model and boundary conditions for FEM simulations. (d) Traction-separation law in cohesive interaction for FEM simulations.

Figure 18:
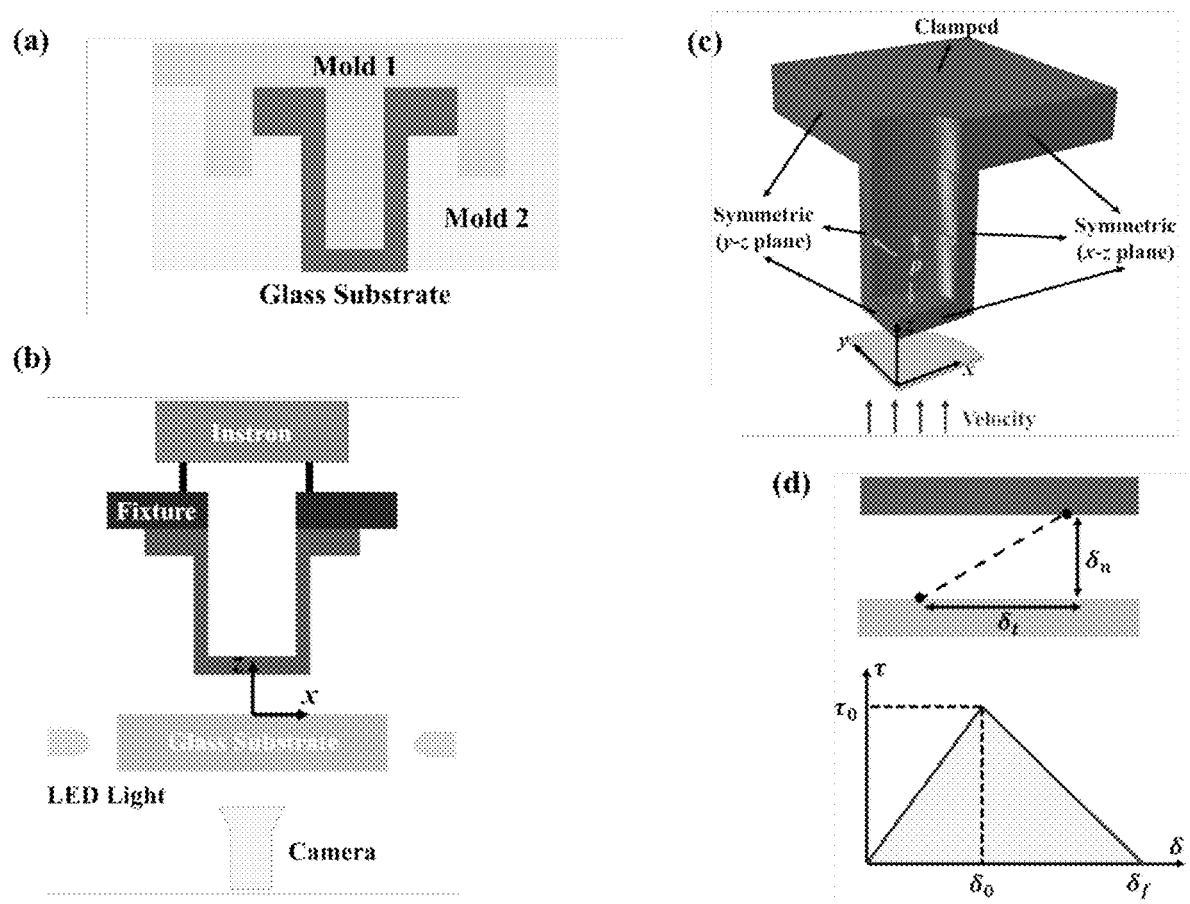

FIG. 18 is a set of images showing FEM simulation results for buckled SHPs of a 2×2 pattern with (a) circular and (b) elliptical contact geometries.

Figure 19:
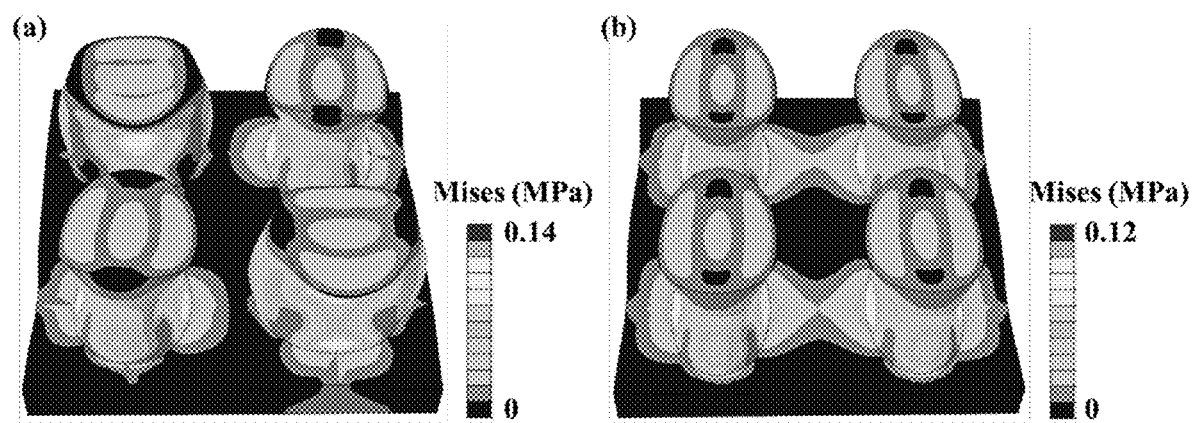

FIG. 19 is a set of images showing an untethered device containing a VPS SIP and a small pump, and various items that can be picked up and released by this untethered device.

DETAILED DESCRIPTION OF THE INVENTION

Figure 1:
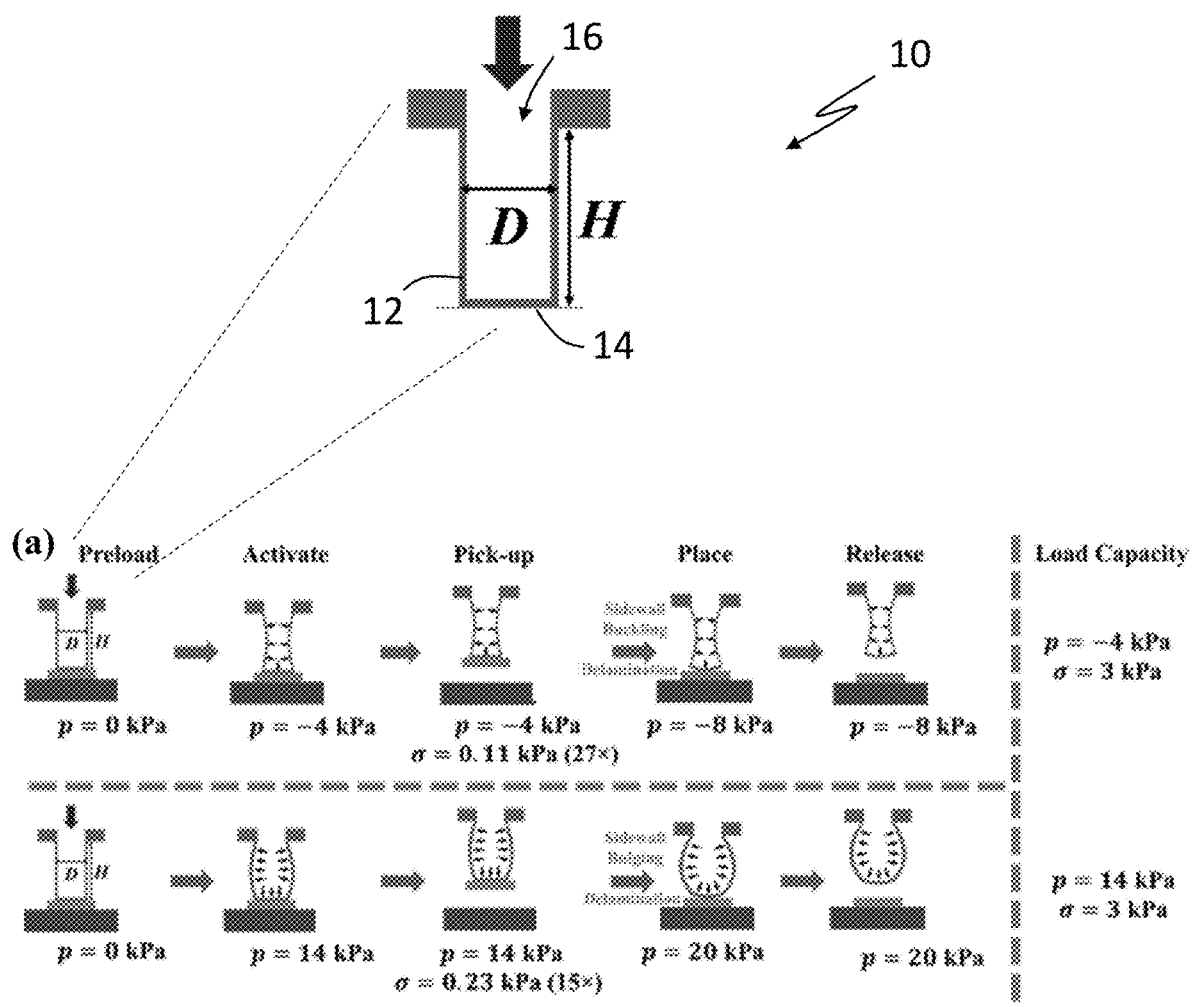
Figure 1:
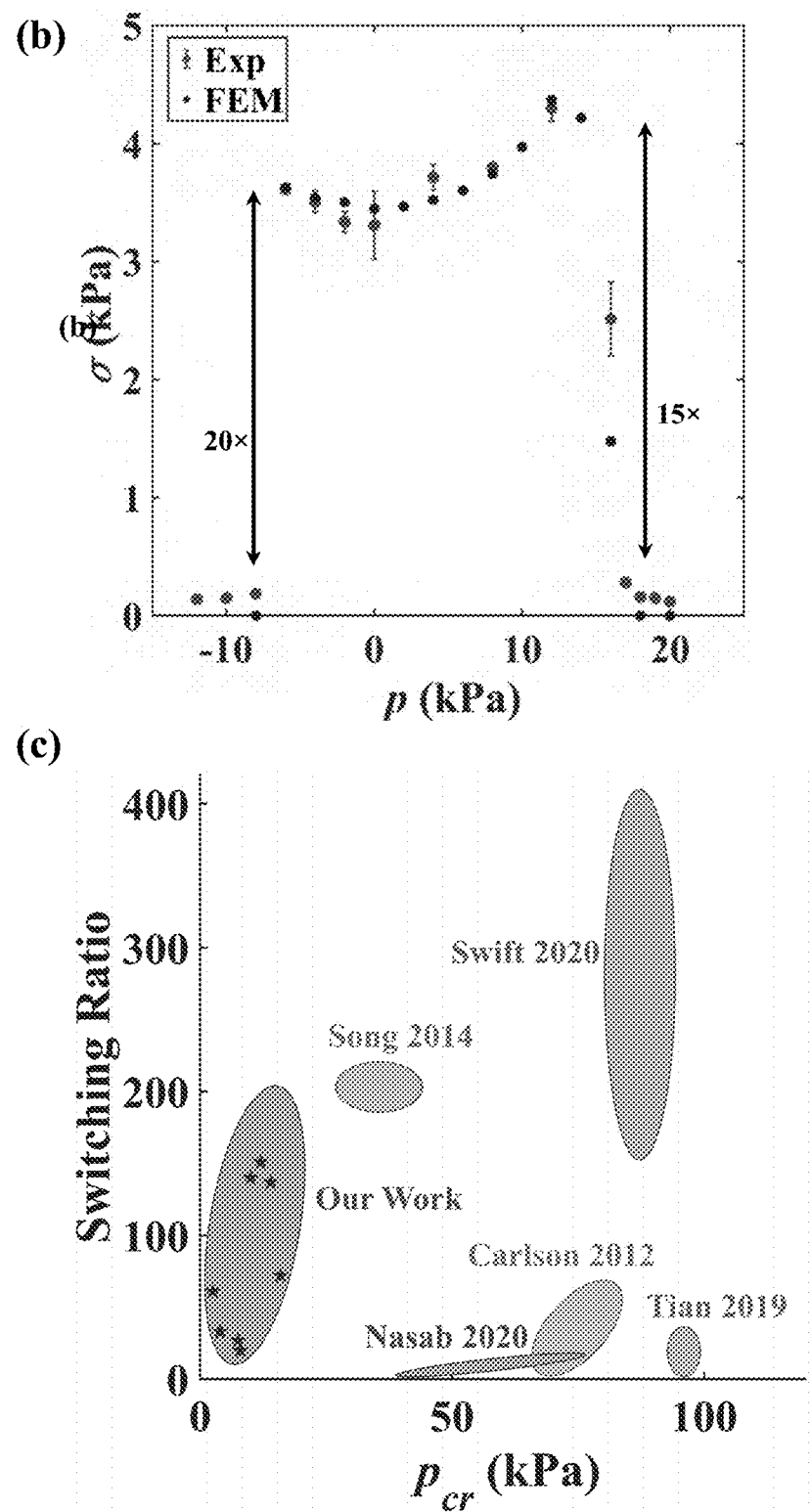
Figure 1:
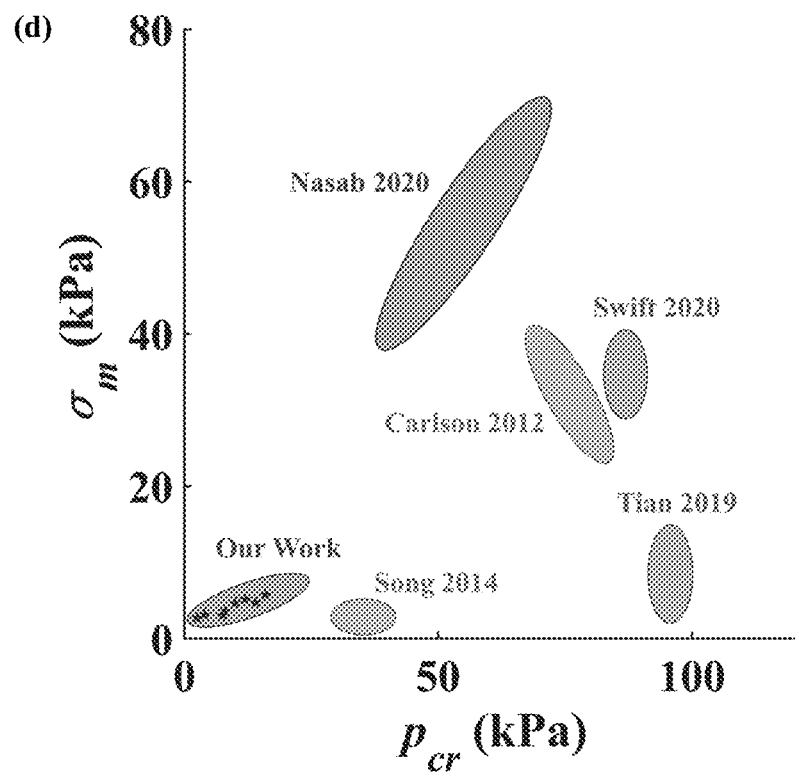
Figure 1:
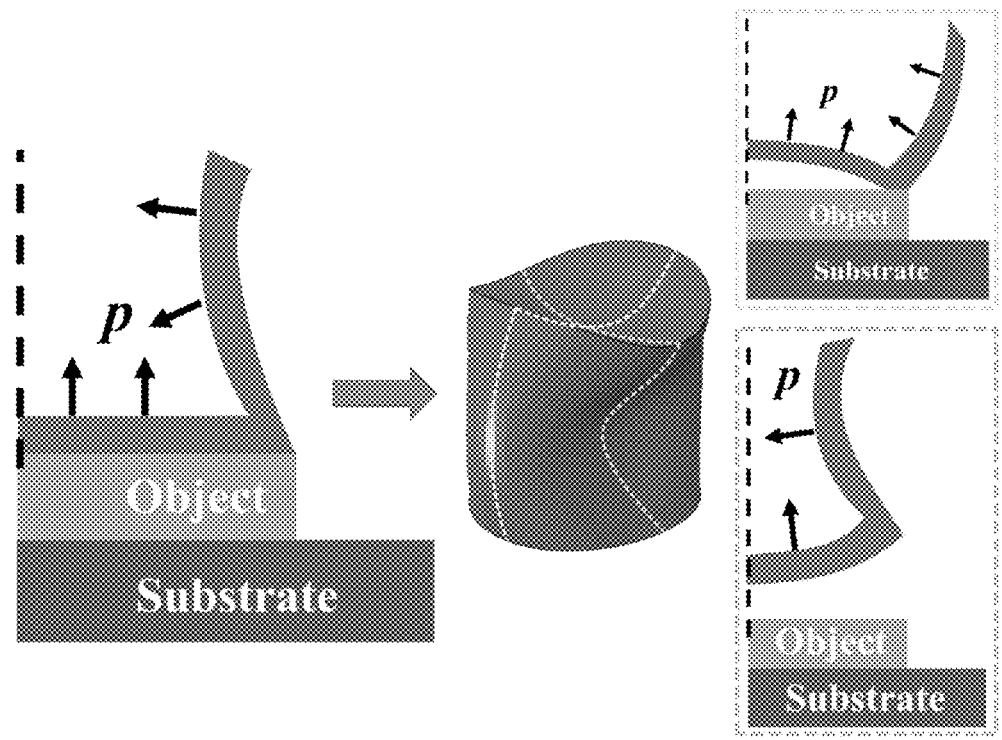
Figure 1:
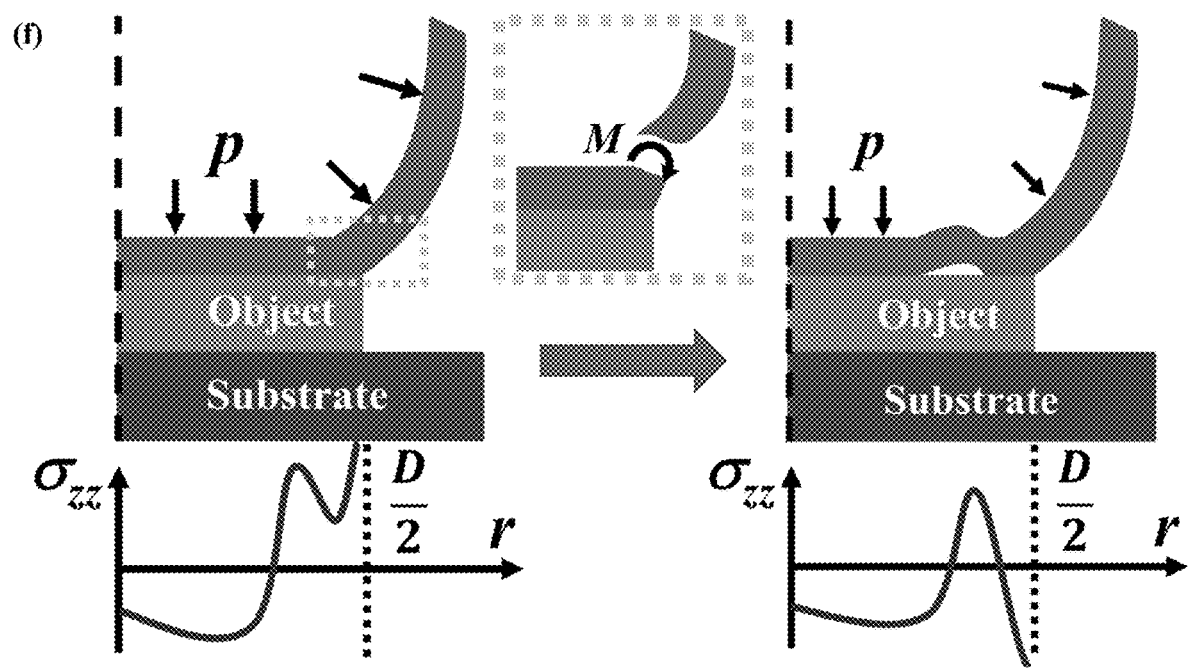

Referring to the figures, wherein like numerals refer to like parts throughout, there is seen in FIG. 1 a class of soft hollow pillars (SHPs) 10 containing a sidewall 12 sealed by a bottom contact membrane 14 with highly tunable dry adhesion under low pressure from a pressure source 16 that can selectively apply or withdraw an activating pressure from inside pillars 10. Unlike the previous designs whose sidewall of the air chamber has negligible or limited deformation during activation, these SHPs allow the sidewall to deform significantly upon inflation or deflation, as seen in FIG. 1(a). The adhesion switching ratio is defined as the highest to the lowest adhesion strength within the activating pressure, as shown in FIG. 1(b), whereas the activating pressure is defined as the critical pressure value leading to drastic adhesion decrease. Within 12 kPa negative pressure, a switching ratio as high as 145× can be achieved, see FIG. 1(c) and Table 1), exploiting shell buckling instability of the sidewall, as seen in FIG. 1(e). Testing established the robustness, untetheredness, and versatility of these SHPs with highly tunable dry adhesion, which bear great potential for many applications in robotic manipulation and locomotion.

As discovered, the buckling deformation ruptures the contact interface and reduces the contact area, leading to a significant decrease of the adhesive force. Meanwhile, a switching ratio of 94× for these SHPs can also be achieved using 20 kPa positive pressure. In this case, the bulging of the sidewall opens an interfacial crack near the contact edge and reduces the adhesion accordingly, as seen in FIG. 1(f).

Using finite element modeling (FEM) and experiments with in-situ interface monitoring, we explored the underlying mechanics governing the observed highly tunable dry adhesion, elucidating the effects of various geometric and material parameters on the performance of the SHPs such as the activating pressure $p_{cr}$ and the maximum adhesion strength. Here, the adhesion strength $\sigma$ is calculated as the pull-off force divided by the area of the contact surface. Based on such analysis, we changed the geometry and material of the SHP for improved performance, as seen in FIG. 1(c), 1(d) and Table 1 below). The low $p_{cr}$ of these SHPs allows us to tune adhesion using a handheld micropump, demonstrating their potential miniaturization, untetheredness and convenient integrability into robotic systems. Such an untethered system is able to pick and release lightweight items with various surface curvature and roughness, with the lightest manipulated item weighing 10 mg. Moreover, we assembled multiple SHPs into an array and realized selective, parallel pick-and-place by independently controlling the internal pressure of different groups of these SHPs. Because of the simple geometry as well as the straightforward working mechanism, our SHPs can be fabricated with multiple elastomeric materials and potentially in small scales, thus facilitating the advance of various fields such as transfer printing, and robotic manipulation, and locomotion.

Example 1

The geometry and working principle of the SHP with highly tunable dry adhesion are illustrated in FIG. 1A. It is of a hollow cylindrical structure with an outer diameter, D and a height, H. The thickness of the bottom membrane and the sidewall is a and t, respectively. The SHP also contains a thick, backing layer that connects to an air channel, allowing one to control the pressure inside on demand.

The SHP relies on the change of the internal pressure p to vary its adhesion strength $\sigma$, and the internal pressure can either be positive or negative. To demonstrate its switchable dry adhesion, a SHP composed of elastomeric material was first made using vinylpolysiloxane (VPS) (FIG. 1(a), Zhermack, Elite Double 8), through a commonly used mold-replica method (FIG. 6), with the geometric parameters as D=6 mm, H=6 mm, a=t=0.8 mm. This SHP is used to pick up and release items with polished surfaces printed by a 3D printer (Objet30 Prime, Stratasys). As shown in FIG. 1(a), the SHP will first be pressed against the targeted object under a pre-load of 200 mN. Then the magnitude of p is increased to −4 kPa or 14 kPa and $\sigma$ will reach 3 kPa (in both scenarios) to enable picking. To release the target object, the magnitude of p is further increased to −8 kPa or 20 kPa and $\sigma$ decreases to 0.11 kPa or 0.23 kPa correspondingly, and the target object will be released. As a result, a switching ratio of 27× (or 15×) can be achieved within 8 kPa (or 20 kPa) by utilizing negative (or positive) pressure.

To quantitatively evaluate the adhesion strength of this SHP as the applied pressure changes, we measured the pull-off force when this SHP contacts and retracts from a flat glass substrate. As shown in FIG. 1(b), the adhesion strength $\sigma$ initially increases when p increases, followed by a sudden drop when p is beyond a critical value $p_{cr}$. Specifically, when p is negative, $\sigma$ will increase from 3.3 kPa to 3.6 kPa when p increases from 0 kPa to −6 kPa. Afterwards, the adhesion strength will suddenly drop to 0.18 kPa when p reaches −8 kPa, leading to a switching ratio of 20×. $\sigma$ will continue to drop to 0.14 kPa when p increases to −12 kPa. In this case, the pull-off force is close to the lower measurement limit of the experimental setup (~1 mN). We recognize that even lower adhesion strength can be achieved if the pressure further increases, resulting in a higher switching ratio. However, to balance the trade-off between the low-pressure actuation and the switching ratio, we use the critical value $p_{cr}$ as the activating pressure to leverage the SHP's performance.

Similar non-monotonic variation of $\sigma$ with pressure change is also found when p is positive. Specifically, when p increases from 0 kPa to 12 kPa, $\sigma$ will increase to 4.3 kPa. Then it will drop quickly to 0.28 kPa when the pressure is increased to 17 kPa, leading to a switching ratio of 15×. $\sigma$ can continue to decrease to 0.12 kPa when the pressure reaches 20 kPa. Thus, initial enhancement followed by a sharp drop of the adhesion strength is observed under both positive and negative pressure.

Despite the same trend of adhesion change, different mechanisms are identified for the negative and positive pressure scenarios. When the internal pressure is negative, the sidewall of the hollow pillar undergoes a buckling instability when the negative pressure exceeds a critical value (FIG. 1(e)). Both the sidewall and the bottom membrane collapse in a non-axisymmetric way and the contact interface is ruptured. Unlike the negative pressure case, when the internal pressure is positive, the deformation of the soft hollow pillar is axisymmetric, as shown in FIG. 1(f). The internal positive pressure will bend the sidewall outwards and apply a bending torque to the contact membrane near the edge. If the pressure is low, the tensile normal stress near the edge will increase and form a second peak, extenuating the tensile stress at the edge and thus suppressing crack initiation from there and increasing the pull-off force. However, when the pressure becomes high, the second peak of the interfacial tensile stress near the edge becomes the only peak, and the edge stress becomes compressive (FIG. 1(f)). As a result, the interfacial failure initiates from the inner region instead from the edge and the adhesion decreases significantly.

Figure 2:
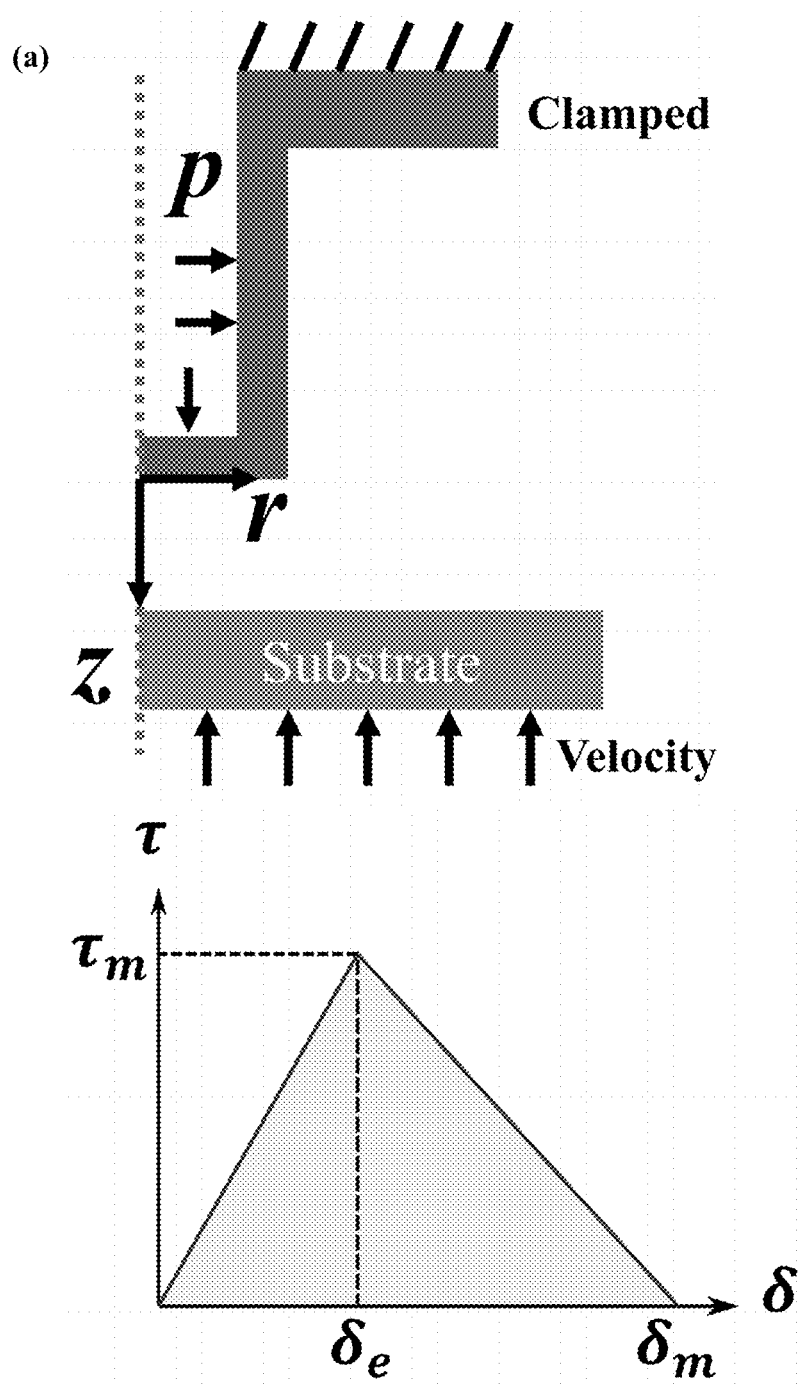
Figure 2:
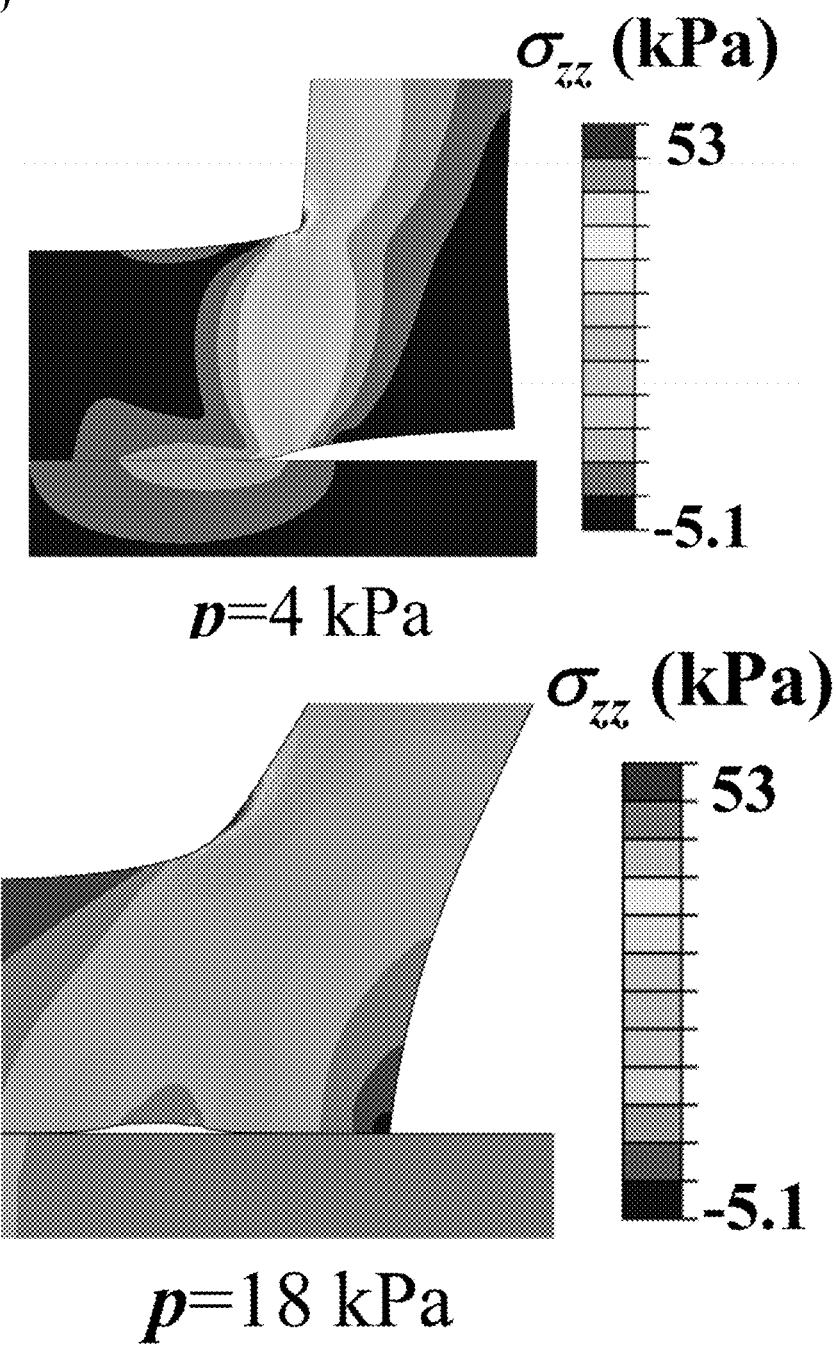
Figure 2:
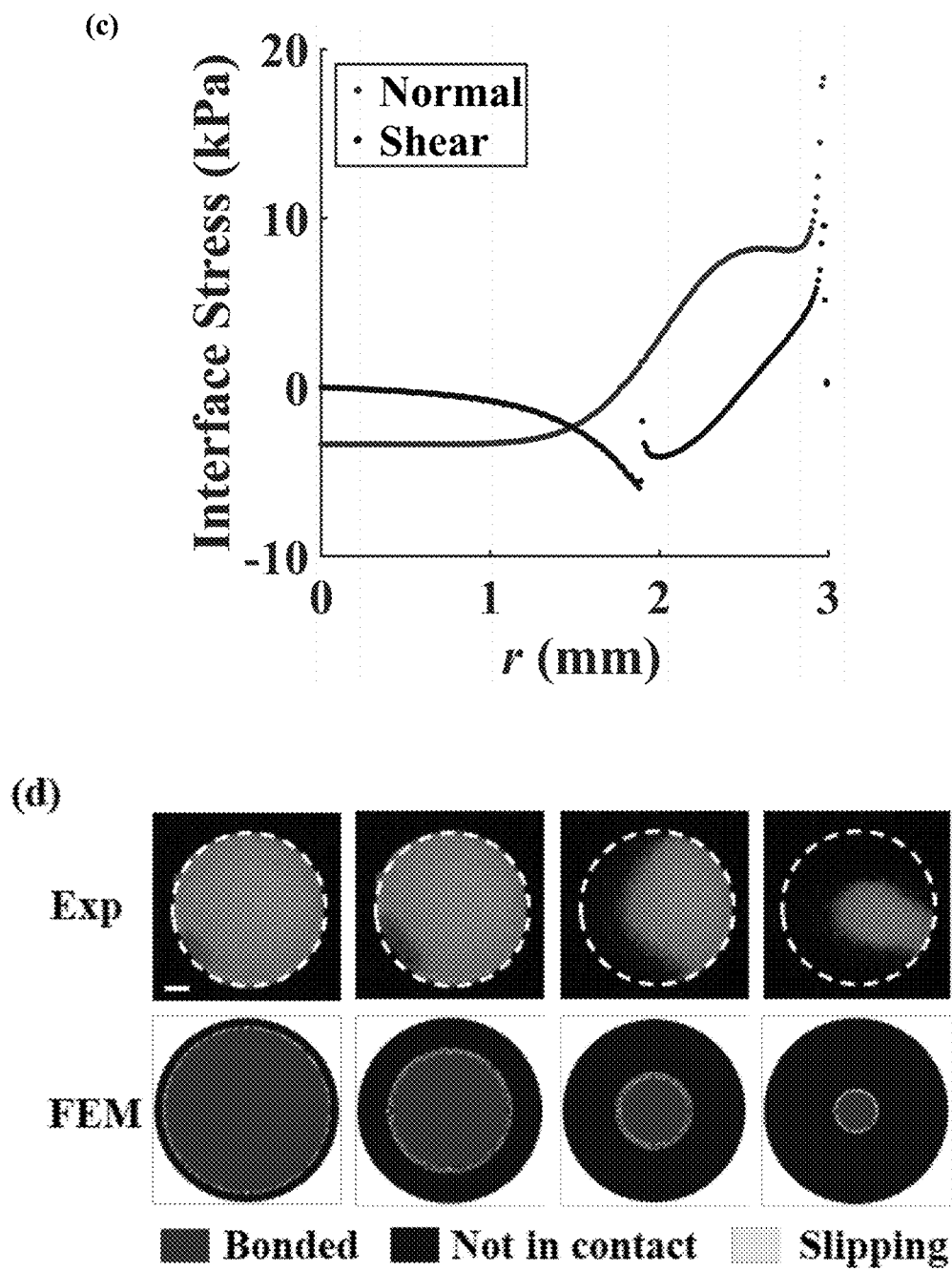
Figure 2:
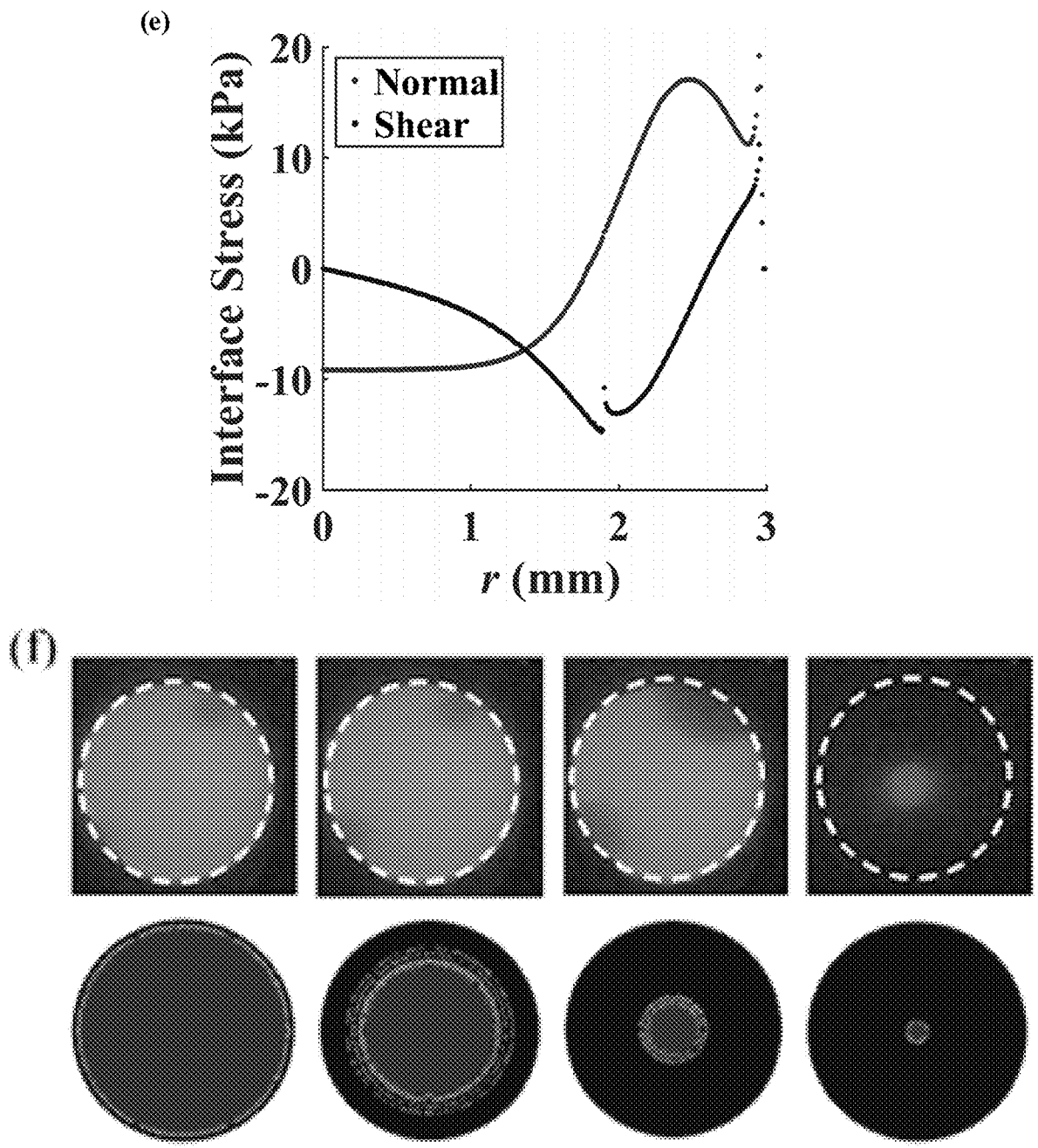
Figure 2:
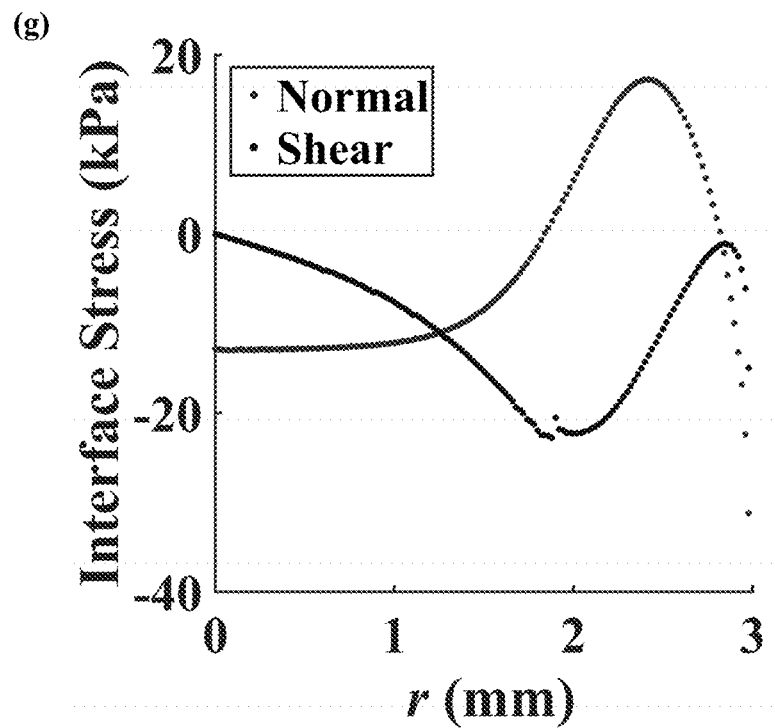
Figure 2:
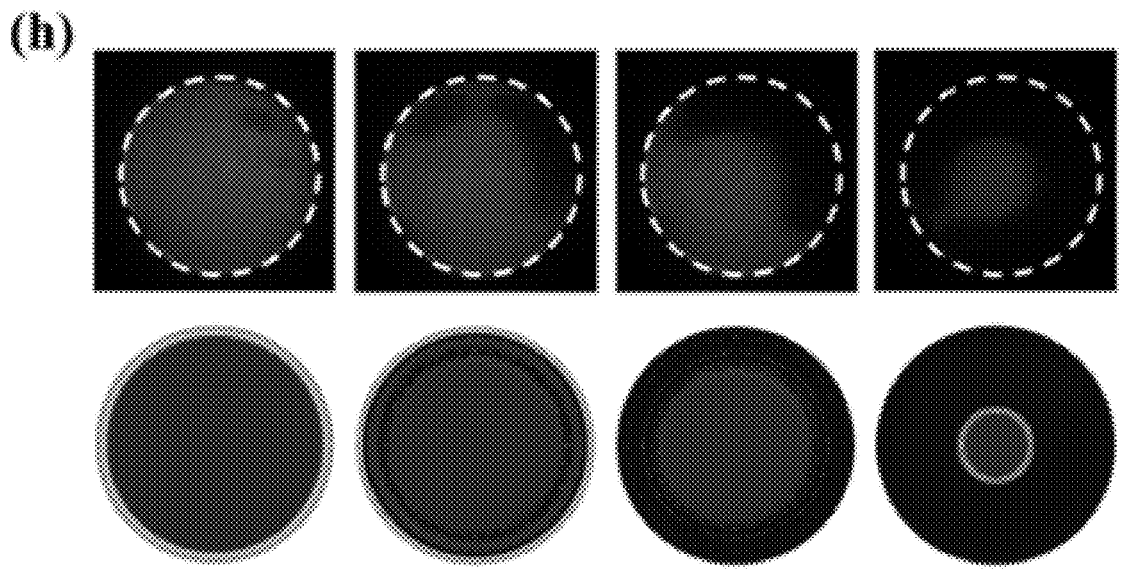
Figure 3:
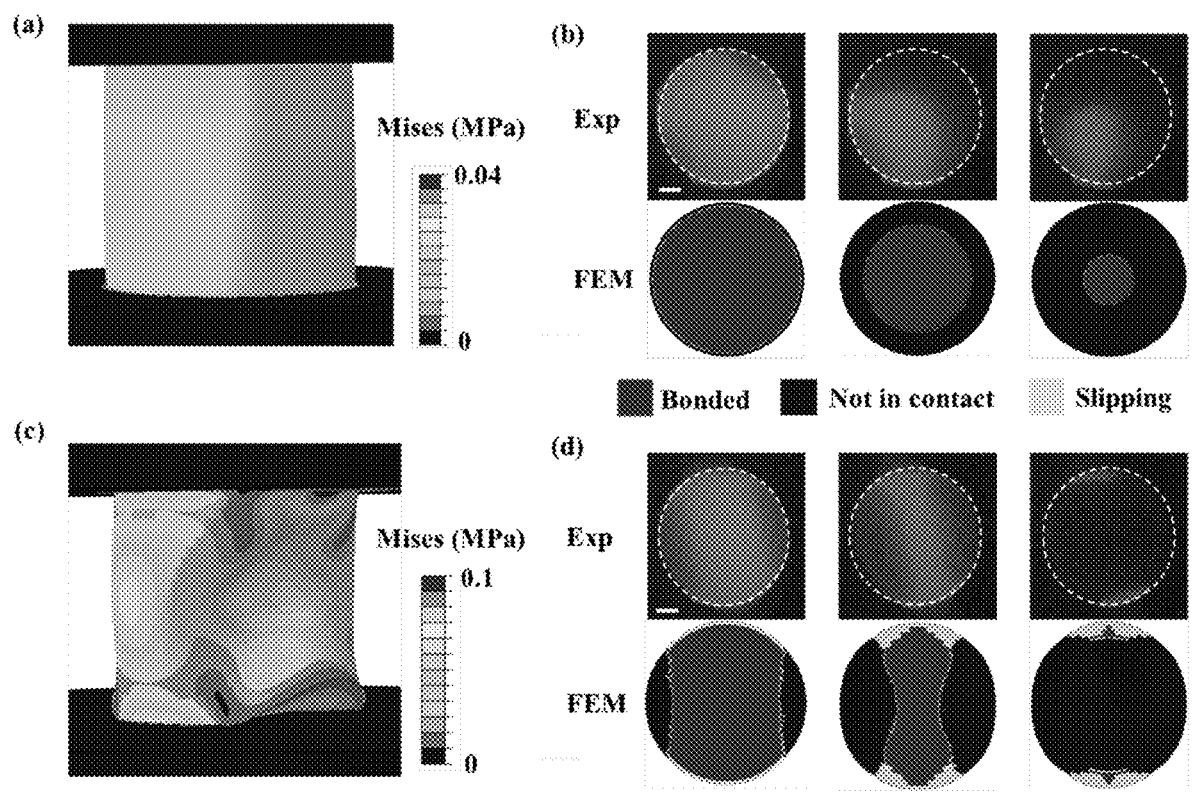

Unlike other pneumatics-controlled tunable grippers whose adhesion strength continuously varies with pressure, the present design features a discontinuous variation (FIG. 1(b)). The adhesion strength will first be enhanced and then undergo a sudden drop when the pressure magnitude reaches a critical value. Such a unique characteristic motivates us to explore the underlying mechanism through a combination of experiments and FEM. In experiments, in addition to measuring the interactive force during retraction, we also visualized the evolution of the contact area by putting LED light at the lateral sides of the glass substrate (FIG. 18) and recoding the contact surface change during adhesion testing as seen in FIGS. 2(d), 2(f), 2(h), 3, and 9. Based on the internal reflection, only the area in contact appears bright due to the scattering light while the dark region indicates contact loss. In FEM, we reproduced the adhesion force characterization tests by clamping the top part of the SHP while moving the rigid substrate towards the contact surface of the SHP as seen in FIG. 2(a). 2D axisymmetric analysis was performed when the internal pressure is positive, based on the experimental observations, whereas a 3D full analysis was used for the negative pressure situation since buckling instability induces non-axisymmetric deformation in experiments. To simulate the dry adhesion, a linear traction-separation interactive property was assigned to the contact interface as seen in FIG. 2(a).

In experiments, the adhesive force reaches its maximum when the interfacial crack initiates. Unlike the reported pneumatics-controlled grippers for which crack always initiates at the contact edge under positive pressure, the interfacial failure of this SHP undergoes a transition from edge crack to inner crack as the pressure magnitude increases. As simulations show in FIG. 2(b), the crack initiates at the edge and propagates inwards during the retraction process when the applied internal pressure is 4 kPa. However, the location of the crack tip will shift to the inner contact area near the edge when the pressure becomes 18 kPa.

To quantitatively explain such a transition, the distribution of the normal and shear stresses that act on the contact surface of the SHP are output from FEM. The SHP has its geometry as D=6 mm, H=6 mm, a=t=0.8 mm. Here, positive values for normal stresses indicate tensile stresses while negative values indicate compressive stresses. For the contact shear stress, a positive value means that the shear force points outwards while a negative value suggests that the shear force points inwards. When the applied internal pressure is 4 kPa, FEM shows that both the normal and shear components of the interfacial stress are the highest at the edge. The normal stress at the edge is tensile, indicating that the crack will initiate at the edge as seen in FIG. 2(c). This prediction is supported by the experimental observation in which the interfacial detachment first appears at the edge and then quickly propagates through the whole interface as seen in FIG. 2(d). As a result, the adhesive force suddenly drops to zero. Both the crack initiation location and the variation of the adhesive force during retraction are reproduced in simulations, which are in good agreement with experiments.

When the internal pressure is increased to 12 kPa, FEM shows that the normal interfacial stress is still the highest at the edge. However, there exists a second peak inside the contact area near the edge and the stress magnitude is close to that at the edge as seen in FIG. 2(e). The emergence of this second peak indicates that the stress concentration at the edge is extenuated, leading to enhancement of the adhesion strength. Correspondingly in experiment, the crack starts to initiate in this region near the edge inside the contact area, see FIG. 2(f), verifying the stress distribution predictions from the simulations. However, the simulations still predict that the crack initiates from the edge. This discrepancy might come from the misalignment between the contact membrane and the glass substrate in experiment.

When the internal positive pressure is more than 12 kPa, the adhesion strength will drop quickly as pressure increases. It is attributed to the fact that the second peak of the contact tensile stress now takes over and becomes the only peak of the stress distribution at the interface, while the stress at the edge becomes compressive (FIG. 2(g)). For instance, when pressure is 18 kPa, both experiment and simulation show that the crack initiates inside the contact area. In experiment, the inner crack grows slowly initially along the circumferential direction. At this stage, the relationship between the traveling distance of the SHP and the interactive force becomes nonlinear. Upon a critical distance between the SHP and the substrate, the crack will grow much faster and propagate across the whole interface except for a small part at the center of the contact surface, resulting in a sudden change of the adhesive force (FIG. 9).

When the internal pressure is negative, the adhesion strength also increases at first and then drops as the pressure magnitude increases (FIG. 1(b)). However, it is revealed that the underlying mechanism is different from the positive pressure case described earlier. For the SHP with the geometry as D=6 mm, H=6 mm, a=t=0.8 mm, when the negative pressure is small, the SHP keeps the axisymmetric shape as the side wall bends inwards (FIG. 3(a)). Previous study has demonstrated that the existence of the negative pressure lessens the stress concentration at the edge, leading to adhesion improvement.[48] Such a mechanism is supported by our numerical results (FIG. 11). In this scenario, both experiment and simulation show that the crack starts from the edge (FIG. 3(b)).

When the magnitude of the negative pressure increases to 8 kPa, the sidewall of the SHP goes through a shell buckling instability. In this situation, both the sidewall and the contact membrane bend inwardly and the axisymmetric shape is broken, as demonstrated by experiment and FEM (FIG. 3(c)). For the current geometry, the buckling mode number along the azimuthal direction is two. The elastic force contributed from the buckling instability detaches the contact membrane from the target substrate and decreases the adhesion significantly. As shown in FIG. 3(d), when the shell buckles, two cracks start from the opposite edges and wedge towards each other. Once they merge in the central part of the contact area, they continue to propagate along the orthogonal direction until only two isolated, tiny contact spots are left.

The working mechanisms of the SHP, including the sidewall buckling instability and the shift of the crack initiation sites under different pressure, indicate that the performance of this SHP depends on its geometry and material properties. Therefore, FEM and experiments were performed to elucidate the effect of these geometric and material parameters on tunable adhesion mechanics so that we could improve the performance of the current approach to highly tunable adhesion by tailoring the geometry and/or constituent material.

There are two parameters of particular interest regarding the performance of these SHPs. One is the critical buckling pressure $p_{cr}$ upon which the adhesion strength decreases significantly under negative pressure. A low $p_{cr}$ has its advantages including quick response, low energy consumption, good air sealing, and the compatibility with miniaturized pumps. The other is the adhesion strength σ that the SHP can offer, which determines the working range of these adhesive systems and also affects tunability. Although the SHP works well with positive pressure, the sharp adhesion decrease in this case involves complex coupling between nonlinear deformation of the hollow pillar and contact mechanics on the interface.

Figure 4:
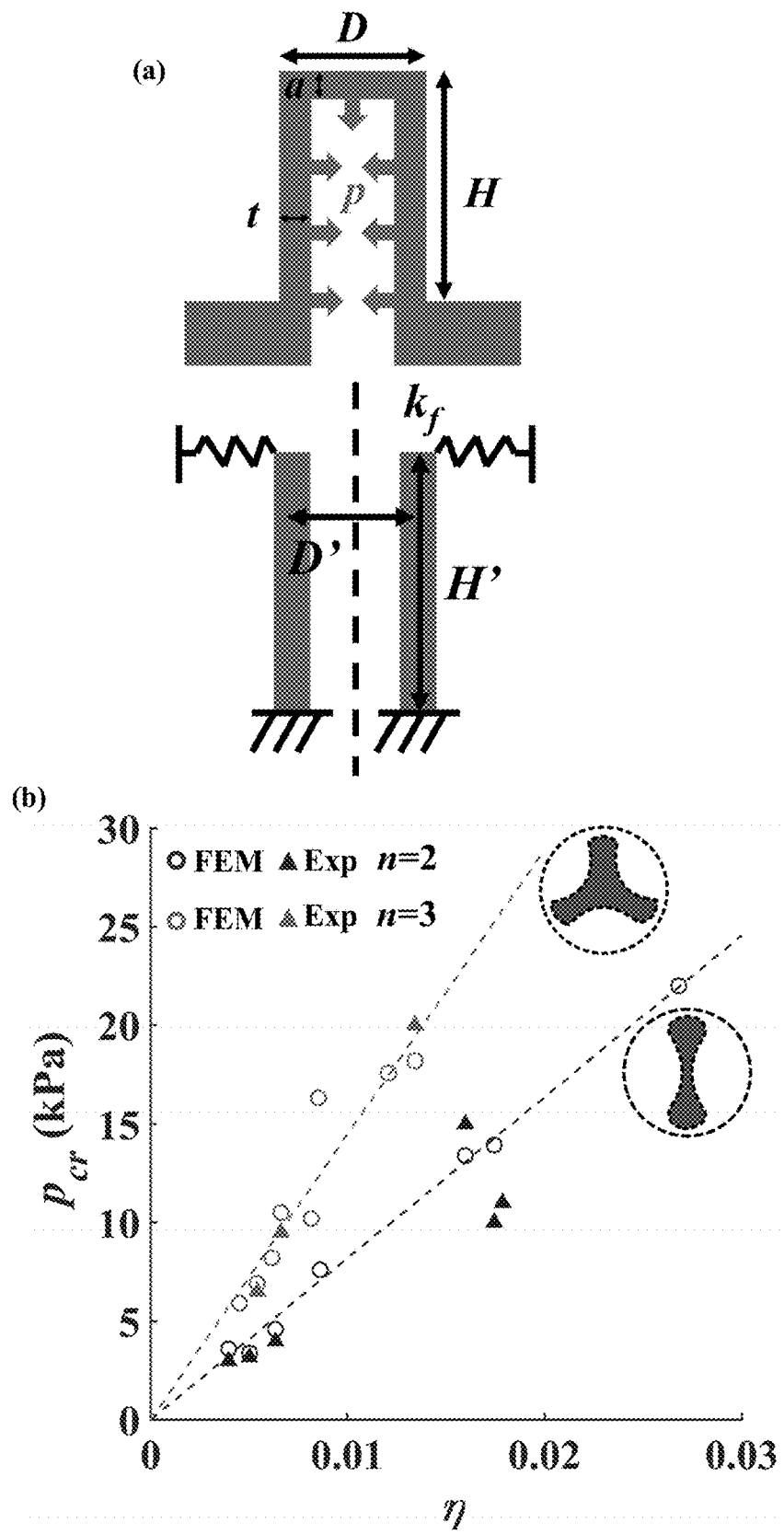
Figure 4:
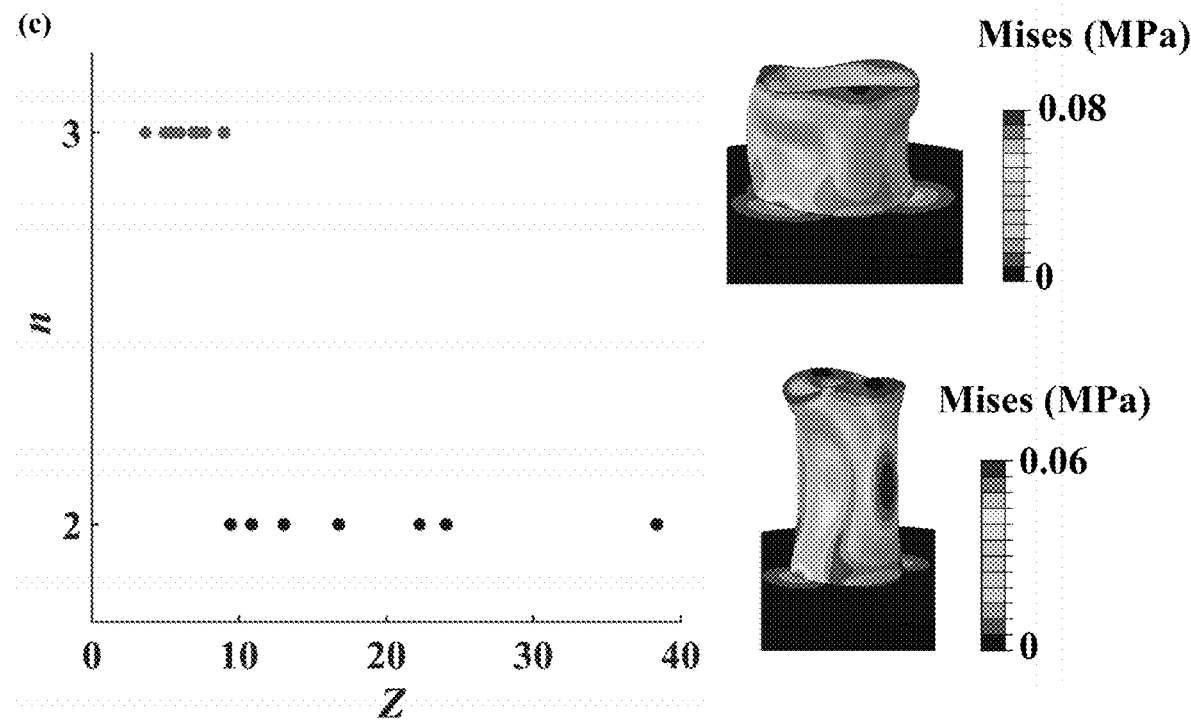
Figure 4:
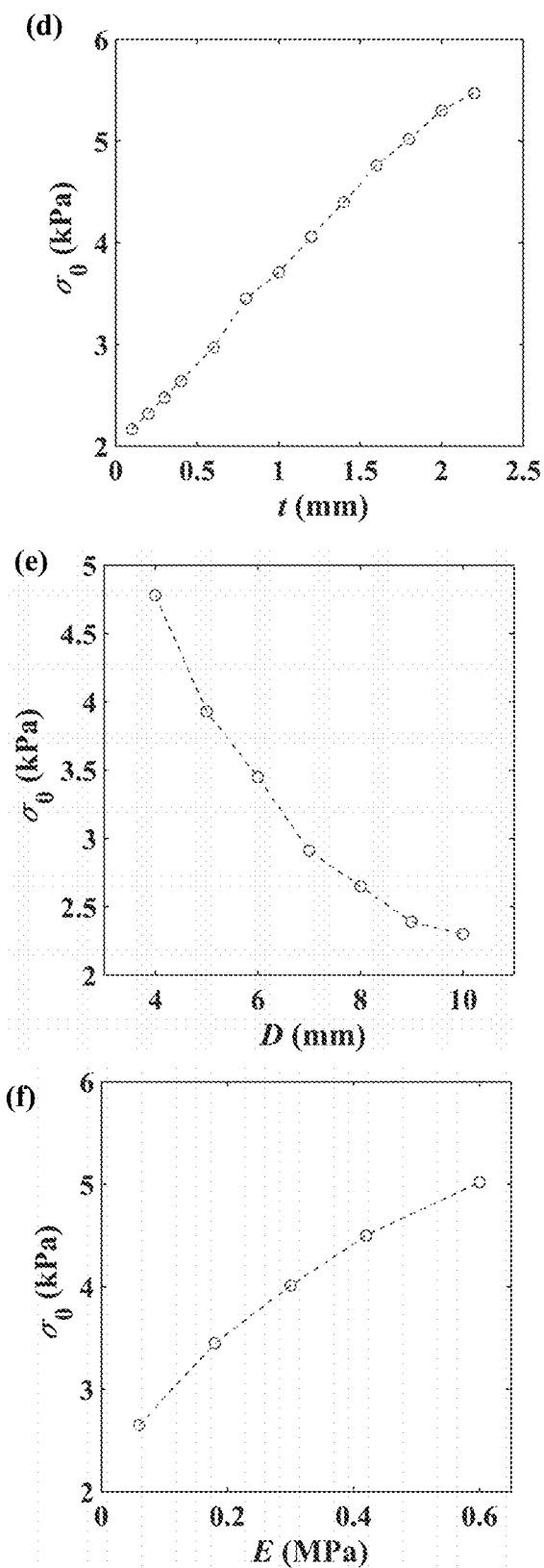

Regarding $p_{cr}$, experimental measurement shows that the adhesive interaction with another surface will not affect its value significantly. Therefore, here for simplicity, sidewall buckling of the soft hollow pillars is evaluated without consideration of dry adhesion at the contact surface. From dimensional analysis, it is intuitive to find that $p_{cr}$ should be linearly proportional to the sidewall's modulus E since it is the only physical parameter that has the unit of force. However, the relationship between $p_{cr}$ and the geometry of the soft hollow pillar remains elusive. For simplicity, the hollow pillar is approximated as a cylindrical shell with two open ends and model the contact membrane as an elastic spring with stiffness $k_f$ (FIG. 4(a)). The neutral plane of the shell has a diameter as D'(D'=D−t) and height H'(H−a/2). Based on a previous study, the critical pressure $p_{cr}$ is estimated to be $$p_{cr} = \frac{4\sqrt{3}}{9(1-v^2)^{3/4}} \pi \alpha E \frac{t^{5/2}}{D'^{3/2}H'} = \frac{4\sqrt{3}}{9(1-v^2)^{3/4}} \pi \alpha E * \eta \quad (1)$$

where $\alpha$ is an empirical parameter and v is the Poisson's ratio. Equation (1) indicates that the pressure is proportional to the dimensionless parameter $\eta = t^{5/2}D^{-3/2}H^{-1}$. The empirical parameter $\alpha$ increases with the spring stiffness $k_f$, which scales as $k_f \sim Ea/D$ (FIG. 12). The linear relationship between $p_{cr}$ and $\eta$ is supported by both experiments and FEM as shown in FIG. 4(b). In all these tests, we keep the parameter a/D constant to rule out the effect of the spring stiffness $k_f$. In the range of the geometry of interest, experiments and simulations also show that the buckling mode number n along the circumferential direction can either be two or three, depending on another dimensionless parameter Batdorf number, $Z=2\sqrt{1-v^2}H'^2D'^{-1}t^{-1}$. When Z is smaller than a critical value $Z_{cr}=9.2$, the buckling mode number n takes three, and when Z is larger than $Z_{cr}$, the mode number n takes two (FIG. 4(c)). Such a transition indicates that a long hollow pillar with thin sidewall tends to buckle with a mode number two while a short pillar with thick sidewall buckles with a mode number three. This agrees with the previous experimental and theoretical studies stating that the mode number two is dominant unless the shell is short enough to have a higher buckling mode number. At the same time, the higher buckling mode number also requires higher critical buckling pressure when $\eta$ stays the same. As shown in FIG. 4(b), the experimental and computational data of critical buckling pressure depending on $\eta$ falls into two groups according to the mode number. The empirical parameter $\alpha$ is calibrated as 2.68 when n=3, which is higher than its value as 1.51 when n=2. The estimation of $\alpha$ is larger than the predictions in the previous study, which is around 0.6~1.2. The difference might come from the relatively thick sidewall in this work, violating the thin-shell assumption adopted to some extent.

In addition to the critical buckling pressure $p_{cr}$, the relationship between the SHP's geometry and another important performance metric, its adhesion strength $\sigma$, was evaluated. FIG. 1(b) suggests that the SHP achieves its maximum adhesion strength under inflation. However, the difference between the maximum adhesion strength $\sigma_m$ and the adhesion strength without pressure $\sigma_0$ is not significant. Therefore, as a primitive estimation, we first carry out simulations on $\sigma_0$. There are in total five parameters that may affect $\sigma_0$, including the diameter D, the height H, the thickness of the sidewall t, the thickness of the bottom membrane a, and Young's modulus E. FEM shows that H and a only slightly affect the adhesion (FIG. 13). This relationship between the adhesion strength and the pillar height is also found in the solid pillars where the adhesion strength scales as $\sigma_- H^{-0.094}$. Among the other three parameters, FEM shows that $\sigma_0$ increases as t increases (FIG. 4(d)). FEM also finds that, the increase of D decreases $\sigma_0$ (FIG. 4(e)) while the increase of the modulus E increases $\sigma_0$ (FIG. 4(f)). These trends are similar to those of the solid cylindrical pillar whose adhesion strength scales as $\sigma_- E^{0.5}D^{-0.406}$.

Figure 5:
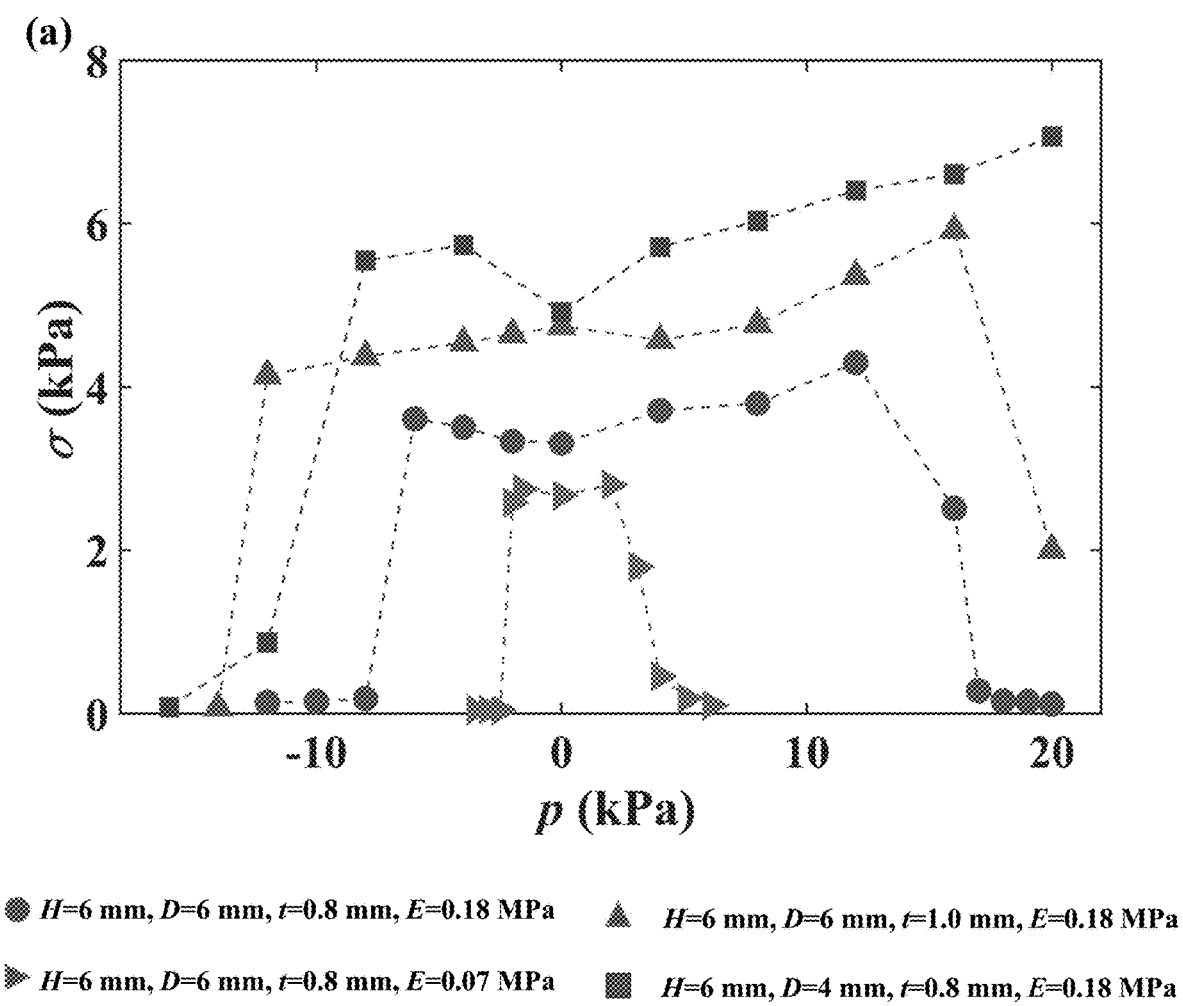
FIG. 5 is (a) Experimental measurement of the adhesion strength σ of SHPs with various geometric parameters under internal pressure. (b) Experimental measurement of the adhesion strength $\sigma_0$ and the critical buckling pressure $p_{cr}$ when the sidewall thickness t increases from 1.0 mm to 1.2 mm while η is fixed as 0.016.
Figure 5:
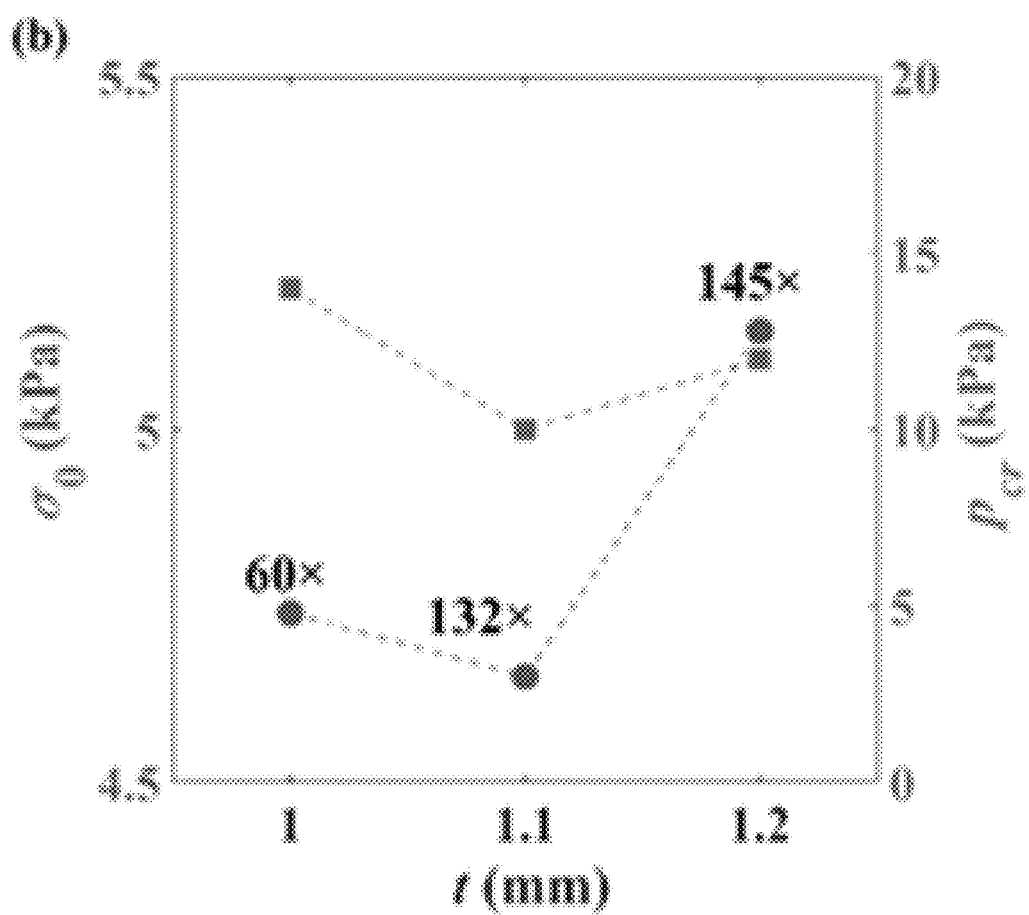

To verify the simulation results, SHPs were fabricated with various geometries and materials and characterized their adhesion strength under different internal pressure. As shown in FIG. 5(a), increasing t from 0.8 mm to 1.0 mm with other parameters fixed indeed elevates $\sigma_0$ from 3.3 kPa to 4.7 kPa and $\sigma_m$ from 4.3 kPa to 5.9 kPa. At the same time, the switching ratio under negative pressure increases from 20× to 60×. However, $p_{cr}$ increases from 8 kPa to 14 kPa. Decreasing D from 6 mm to 4 mm can also increase $\sigma_0$ to 4.9 kPa and $\sigma_m$ to 7.1 kPa, resulting in a higher switching ratio of 72× in the negative pressure regime. In the meanwhile, $p_{cr}$ increases to 16 kPa. In addition to the geometry, we also fabricated SHPs using softer polymer such as EcoFlex-30 (Smooth-On) whose modulus was measured as 0.07 MPa. The lower modulus decreases $\sigma_0$ to 2.7 kPa and $\sigma_m$ to 2.8 kPa. However, $p_{cr}$ is also reduced to only 2.5 kPa. All these experimental measurements qualitatively agree with the FEM predictions.

Guided by the above analysis, the SHP's tunable adhesion performance may be improved by changing its geometry alone. Specifically, it is desirable to increase its adhesion strength and thus the switching ratio while keeping low activating pressure. To achieve such a goal, the thickness of the sidewall t was increased to increase the adhesion strength as seen in FIG. 4(d). At the same time, the height H is also increased to keep the dimensionless parameter $\eta$ constant to maintain the critical buckling pressure (Equation 1). Although increasing the diameter D can also keep the buckling pressure unchanged (Equation 1), it will decrease the adhesion strength (FIG. 4(e)), yet the height H only slightly affects the adhesion strength. As demonstrated by experiments (FIG. 5(b)), when $\eta$ is fixed as 0.016, the buckling pressure keeps almost the same around 12 kPa as the sidewall thickness t increases from 1.0 mm to 1.2 mm. In the meanwhile, the adhesion strength $\sigma_0$ increases from 4.74 kPa to 5.74 kPa (FIG. 5b). As a result, the switching ratio using the negative pressure increases from 60× to 145×.

The SHPs in this work require less than 15 kPa to realize dry adhesion change of two orders of magnitude. This characteristic allows it to be actuated by miniaturized pumps to realize an untethered, small-sized system with good portability and autonomy. To demonstrate such an advantage, a commercial, handheld micro-pump with low power (Flextailgear, Max Pump2 Pro) that can provide both negative and positive pressure within 4.9 kPa was chosen. The SHP was connected to the micropump so that the activation could be controlled by simply pressing the "on" and "off" buttons. To cater to the small pressure of the micropump, the geometry or material of the SHP was tailored to ensure activation. For negative pressure, a SHP made of VPS with geometric parameters D=H=6 mm, t=a=0.7 mm was used. For positive pressure, a SHP made of EcoFlex-30 with geometric parameters D=H=6 mm, t=a=0.6 mm was used. The micropump-actuated SHPs are able to pick up and release items with various curvature and surface texture, including a LED light, a balsawood piece, a micro-SD card and a piece of paper. The lightest item, which is a piece of balsawood, weighs 10 mg, corresponding to a low adhesion strength of 0.003 kPa. In addition, the SHPs were also tested against other items including an electronic multiplexer, a micro-capacitor, a metal can, a piece of hard plastics, a glass slide, a copper sheet and a Teflon sheet, demonstrating the robustness and the vast working range of this design.

In addition to a single SHP, an array of SHPs were also assembled together into a pattern and independently control the internal pressure of each SHP to realize selective pick-and-place. The perpendicular alignment between the air channel and the contact membrane in this design ensures that the array of SHPs can have a large packing density. For proof of concept, an array of SHPs was fabricated and connected to a 3D-printed air channel. All SHPs have the same geometry as D=H=6 mm, t=a=0.8 mm. The distance between the center of the adjacent SHPs is 9 mm. For simplicity, the air channel is designed to independently control the internal pressure of two groups of SHPs, with one group featuring the letters "SU". To realize selective pick-and-place, the array will first approach and contact an array of objects with preload. At this stage, only SHPs that occupy the non-"SU" positions will buckle under the negative pressure of −8 kPa. In the second step, the array will retract and pick up the "SU" objects and leave the other group of objects on the donor substrate. Finally, the array will approach the receiver substrate and the "SU" SHPs will be activated, releasing the objects resembling the "SU."

This example demonstrates that the present invention provides a novel approach to highly tunable dry adhesion through buckling instability in soft hollow pillars triggered by low pressure. Under both negative and positive pressure, the adhesion strength initially increases as the pressure magnitude increases, followed by a sharp drop when the pressure magnitude exceeds a critical value. When the internal pressure is positive, such a non-monotonic variation is caused by the transition of edge crack failure to inner crack failure at the contact interface as the pressure increases. Under negative pressure, it is the shell buckling instability of the sidewall that detaches the contact membrane from the substrate and reduces the contact area, leading to a substantial decrease of the adhesive force. Based on the combination of experiments and FEM, we identified the relationship between SHP's geometric or material parameters and its performance metrics including the activating pressure and the adhesion strength. Based on these examinations, we successfully improved the switching ratio of the tunable adhesive to 145× while keeping the activating pressure as low as 12 kPa by tailoring the geometric parameters alone.

To demonstrate the potential miniaturization and the convenient integrability of these SHPs into existing robotic systems, a SHP was actuated using a micro-pump with low power to pick up and release lightweight items with a variety of curvatures and surface textures, and the lightest item that can be manipulated weighs 10 mg. Furthermore, an array of SHPs was assembled to realize robust selective pick-and-place with a large packing density. The robust pick-and-place ability as well as the low activating pressure indicate low energy consumption, compatibility with miniaturized pumps, quick response, good air sealing and less material deterioration, guaranteeing high energetic efficiency and long working life when such a design is integrated into existing robotic systems. Furthermore, the simple geometry of the SHP suggests feasible fabrication on the microscale using a variety of constituent materials and potential application in related fields such as transfer printing, haptics and robotic locomotion.

Figure 6:
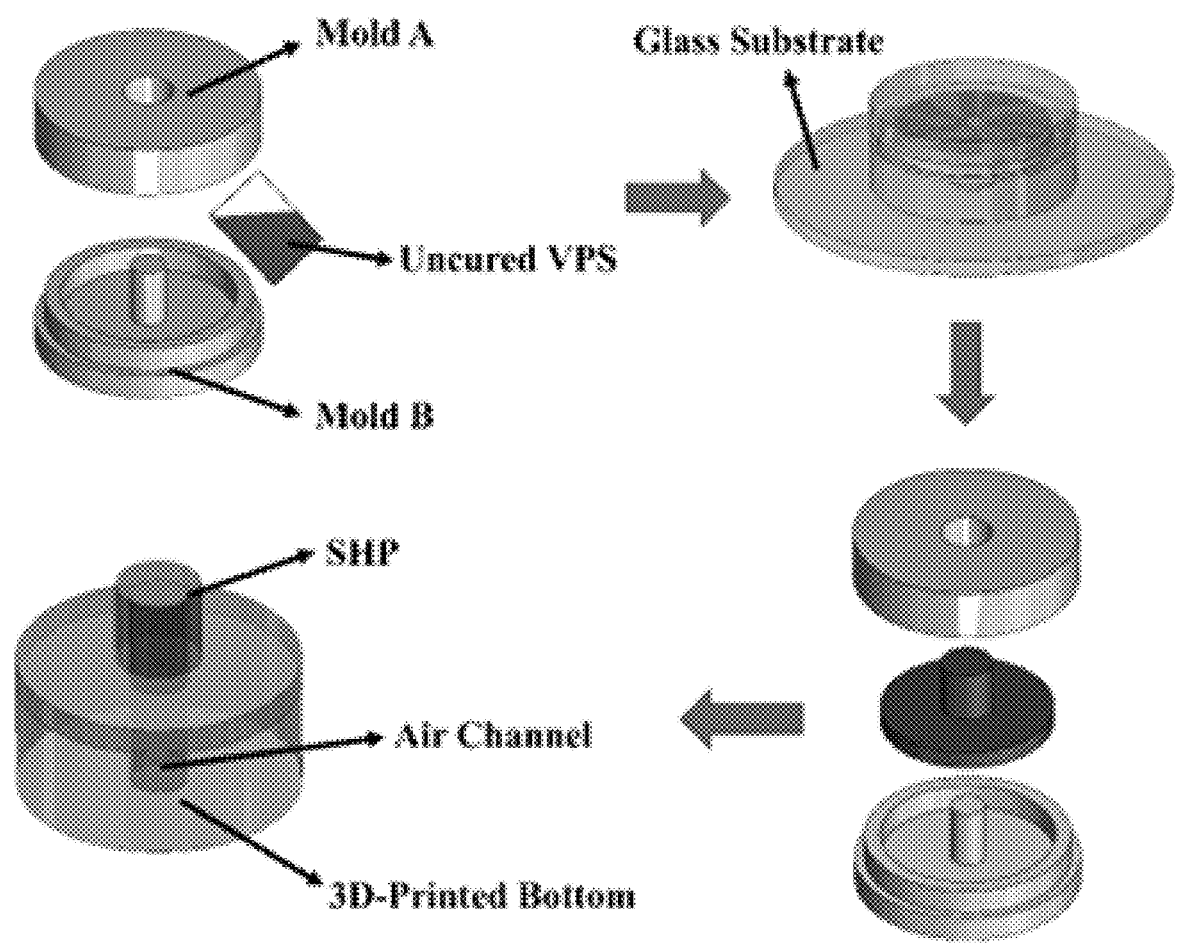
FIG. 6 is a schematic of the mold-replica method for fabricating SHPs according to the present invention.

In the present example, all the SHPs were fabricated using the mold-replica method. FIG. 6 shows the schematic illustration of the multi-step fabrication process. The adhesion characterization tests on the SHPs under various internal pressure were performed using an Instron microtester (model 68SC1) with a 50N load cell. The measurement precision of the test is 1 mN. A custom-made fixture was used to hold the substrate and monitor the contact surface. All characterization tests are composed of three loading stages: approaching, holding in contact with a preload, and retracting.

Figure 7:
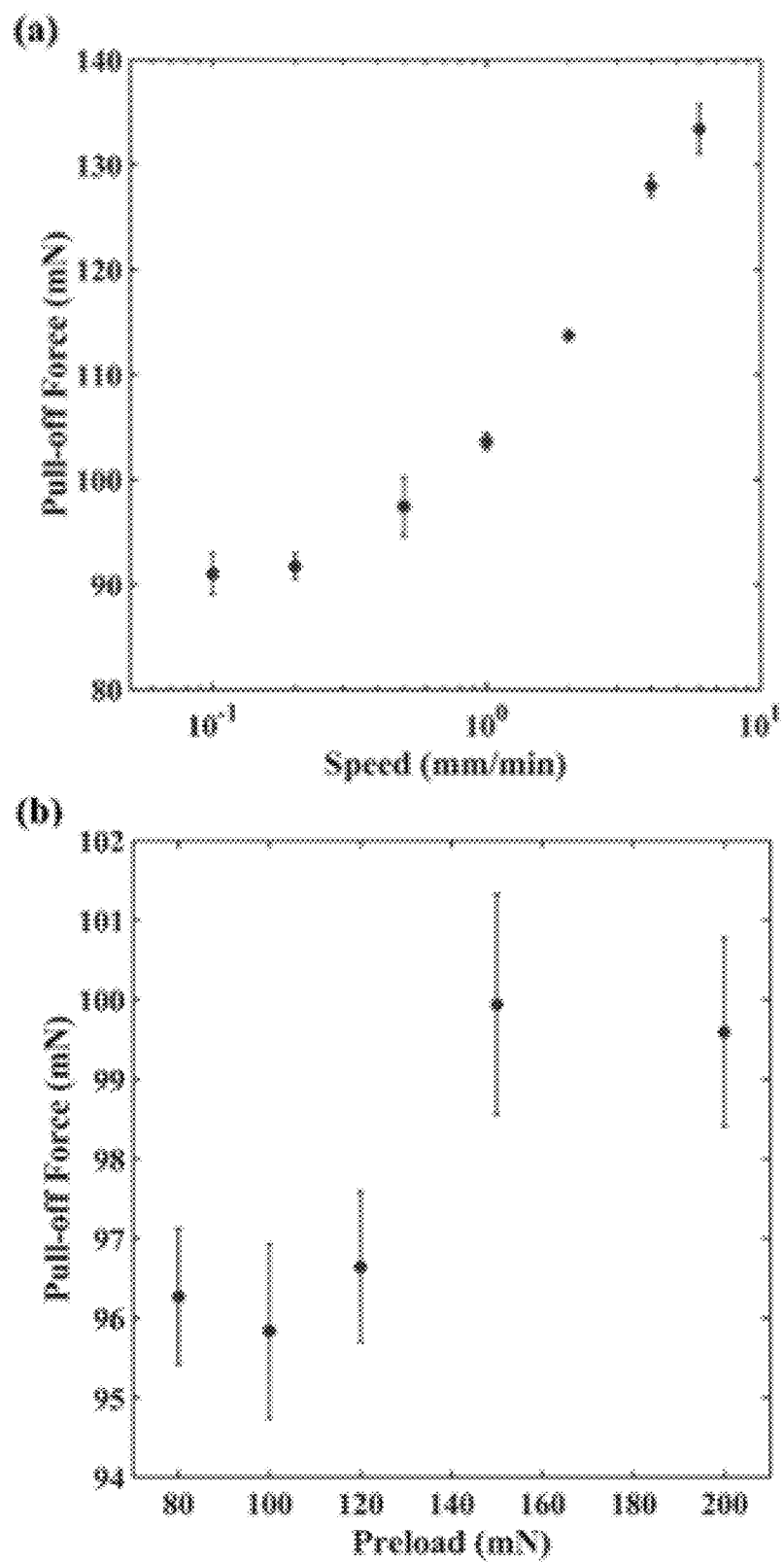
FIG. 7 is a pair of graphs of the variation of the pull-off force of a non-pressurized SHP versus (a) the retracting speed and (b) the preload.
Figure 8:
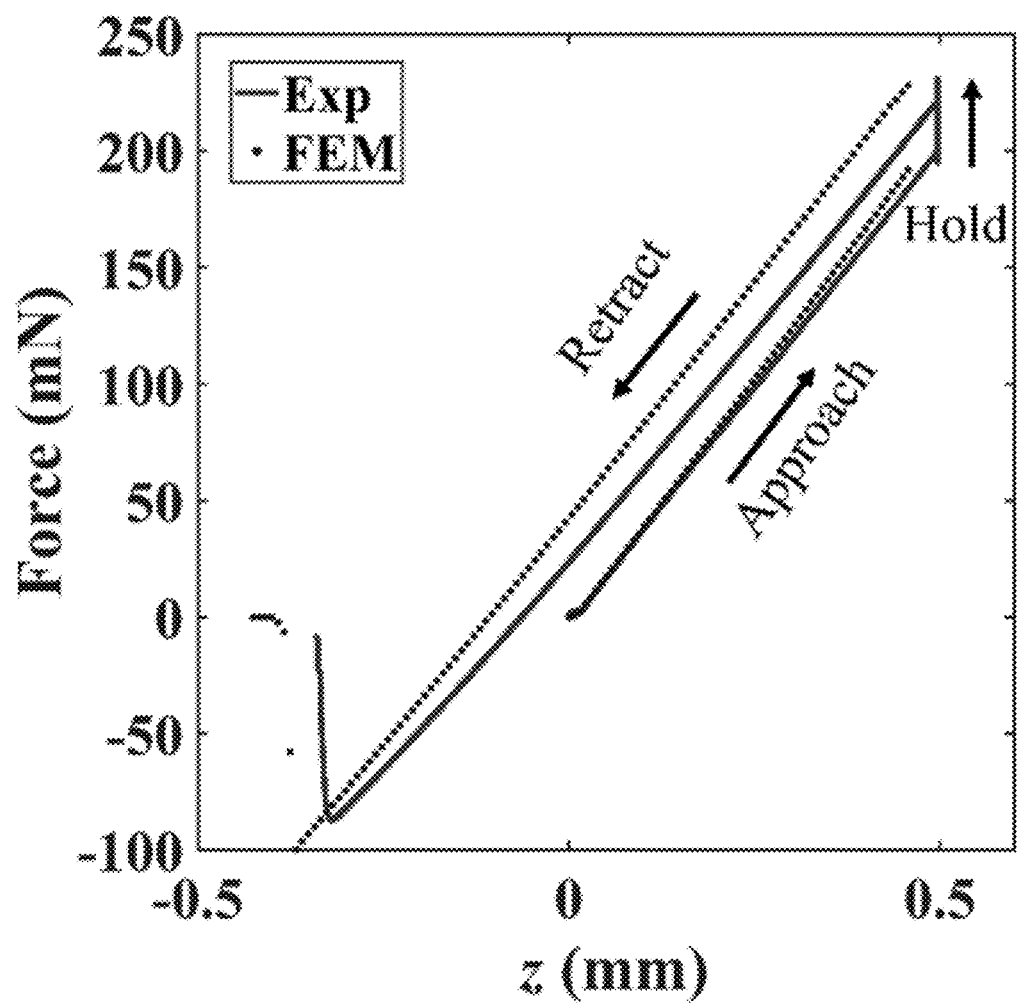
FIG. 8 is a graph of the typical force-displacement curve during adhesion characterization tests from experiments and simulations. The internal positive pressure is 4 kPa.

Preliminary tests were performed to identify the optimal retracting speed and preload to ensure an intact contact between the SHPs and the glass substrate and eliminate the effects of viscoelasticity. The approaching speed is set as 1 mm/min. The SHP keeps in contact with the glass substrate under a pre-load for 60 s before retracting. A pre-load of 200 mN was used and a pull-off force of a SHP (D=6 mm, H=6 mm, t=a=0.8 mm) was measured under various retracting speeds. The pull-off force decreases as the retracting speed is reduced because the viscoelastic effect is weakened. The pull-off force reaches a saturated value when the speed reaches 0.2 mm/min, as see in FIG. 7(a), which is used as the retracting speed for further tests. Similarly, using a retracting speed of 0.2 mm/min, the pull-off force was measured under various pre-loads. The pull-off force increases slightly when the pre-load increases and becomes steady when the preload approaches 200 mN, as seen in FIG. 7(b). Therefore, a preload of 200 mN was used for further tests in this study.

Table 1 summarizes the performance data of the SHPs reported in FIG. 1(c) in the main manuscript, as well as the associated geometry and material information. Note that for each SHP one switching ratio is reported (the higher one under positive and negative pressure), all of which happen to be under negative pressure.

TABLE 1

Performance of eight SHPS with various geometries and materials under negative pressure

| t (mm) | D (mm) | H (mm) | a (mm) | Material | Switching Ratio | $p_{cr}$ (kPa) | $\sigma_m$ (kPa) |
|---|---|---|---|---|---|---|---|
| 0.8 | 8 | 6 | 1.06 | VPS | 27× | 7.5 | 3.05 |
| 0.8 | 6 | 6 | 0.8 | VPS | 20× | 8.0 | 3.61 |
| 0.6 | 6 | 6 | 0.8 | VPS | 33× | 4.0 | 3.14 |
| 1.0 | 6 | 6 | 0.8 | VPS | 60× | 14 | 4.74 |
| 0.8 | 6 | 6 | 0.8 | EcoFlex-30 | 61× | 2.5 | 2.72 |
| 1.1 | 6 | 7.7 | 0.8 | VPS | 132× | 10 | 4.65 |
| 1.2 | 6 | 9.8 | 0.8 | VPS | 145× | 12 | 5.14 |
| 0.8 | 4 | 6 | 0.53 | VPS | 72× | 16 | 5.74 |

The commercial software ABAQUS was employed to simulate the adhesive interaction between the SHP and the substrate under various internal pressure. Based on the experimental observations, 2D axisymmetric analysis was used when the internal pressure is positive. When the internal pressure is negative, a 2D axisymmetric analysis was also used before sidewall buckling while a 3D full analysis was applied when the sidewall of the SHP buckles. Incompressible Neo-Hookean material property was chosen for both VPS and EcoFlex-30. Based on the tensile test, the Young's modulus of VPS was measured as 0.18 MPa while the modulus of EcoFlex-30 was measured as 0.066 MPa, as seen in FIG. 13. Therefore, for VPS, the coefficients were chosen as $C_{10}$=0.03 MPa, $D_1$=0 MPa$^{-1}$. For EcoFlex-30, the coefficients were chosen as $C_{10}$=0.011 MPa, $D_1$=0 MPa$^{-1}$.

In FEM, the same geometry of the SHPs was used as in experiments. The bottom surface is clamped, reproducing the bonding condition in experiment. Three steps were set up with dynamic implicit analysis. In the first step, the substrate will approach the SHP and form contact until the compressive force becomes 200 mN. Then it is held still for 60 s as in experiments. In this step, the pressure will be applied to the internal surface of the SHP. Finally, it will retract with the speed of 0.2 mm/min until the contact interface fails.

To simulate the dry adhesion, the surface-to-surface contact property was assigned to the contact surface of the SHP and the substrate in Abaqus. Finite sliding with node-to-surface discretization method was chosen. For the interaction property, the normal behavior was assigned as "hard" contact while the tangential behavior was assigned as "frictionless". Cohesive behavior is allowed during repeated post-failure contacts and the stiffness coefficients were set as $K_{nn}$=10 MPa/mm, $K_{ss}$=$K_{tt}$=15 MPa/mm. Before interfacial damage, the contact stress is calculated as $$\tau_n = K_{nn}\delta_n$$

$$\tau_s = K_{ss}\delta_s$$

$$\tau_t = K_{tt}\delta_t$$

where $\tau_n$, $\tau_s$ and $\tau_t$ represent the components of the interfacial stress $\tau$ along the normal and two orthogonal tangential directions, respectively. $\delta_n$, $\delta_s$ and $\delta_t$ denote the components of the separation $\delta$ along the normal and tangential directions, respectively.

The interfacial damage is initiated based on the quadratic traction criterion as $$\left(\frac{\tau_n}{\tau_{n,m}}\right)^2 + \left(\frac{\tau_s}{\tau_{s,m}}\right)^2 + \left(\frac{\tau_t}{\tau_{t,m}}\right)^2 = 1$$

where $\tau_{n,m}$, $\tau_{s,m}$ and $\tau_{t,m}$ represent the maximum contact stress along the normal and tangential directions, respectively. After initiation, the damage follows a linear evolution as $$\tau_n = (1-D)K_{nn}\delta_n$$

$$\tau_s = (1-D)K_{ss}\delta_s$$

$$\tau_t = (1-D)K_{tt}\delta_t$$

The damage variable D is defined as $$D = \frac{\delta_m(\delta - \delta_e)}{\delta(\delta_m - \delta_e)}$$

where $\delta$ is the current separation, $\delta_e$ is the maximum separation before damage, and $\delta_m$ is the separation at complete interfacial failure. The scalar D thus monotonically evolves from 0 when the damage is initiated to 1 when the damage is complete. In our case, $\delta_m$=0.004 mm. To stabilize the simulation of the interfacial separation, we chose the viscosity coefficient as 0.1.

For the 2D axisymmetric analysis, a 4-node bilinear axisymmetric quadrilateral element (CAX4RH) was used. Hybrid formulation with enhanced hourglass control is activated to help convergence. In the 3D full analysis, an 8-node linear brick element with hybrid formulation was chosen (C3D8RH). Mesh refinement study was performed for both cases.

In the 3D full analysis, a concentrated force was used at opposite sides on the sidewall of the SHP as a perturbation to initiate buckling. Once buckling starts under negative pressure, the perturbation was removed.

Theoretical Analysis of the Critical Buckling Pressure $p_{cr}$

A previous study identifies the relationship between the critical buckling pressure of a thin cylindrical shell and its geometry as $$p_{cr} = \frac{2\alpha\pi^2 E}{3\sqrt{1-v^2}}\left(\frac{t}{D'}\right)^2 \frac{1}{Z}\sqrt{1 + \frac{8Z}{3\pi^2}}$$

where E is the Young's modulus, v is the Poisson's ratio, t is the sidewall's thickness, D' is the diameter of the shell's neutral plane and Z is the dimensionless Batdorf number that is defined as $$Z = 2\sqrt{1-v^2}\frac{H'^2}{tD'}$$

where H' is the height of the shell's neutral plane. The empirical parameter $\alpha$ depends on the boundary condition and the spring stiffness $k_f$, while the buckling mode number n depends on Z. Note that Z is higher when the shell is taller with a thinner sidewall.

The SHP in this example resembles a shell. However, in most cases, Z is larger than 10 in the scope of the geometric parameters of interest. Therefore, for a rough estimation, we simplified the expression of the critical buckling pressure $p_{cr}$ as $$p_{cr} = \frac{4\sqrt{3}}{9}\frac{\alpha\pi E}{(1-v^2)^{0.75}}\frac{t^{5/2}}{D'^{3/2}H'} = \frac{4\sqrt{3}}{9}\frac{\alpha\pi E}{(1-v^2)^{0.75}} * \eta$$

This way a new dimensionless number $$\eta = \frac{t^{5/2}}{D'^{3/2}H'}$$

is recognized as the dominant factor affecting $p_{cr}$ for SHPs under the approximation of thin shells.

The SHPs was integrated with a micropump that can output both positive and negative pressure ~5 kPa to obtain an untethered handheld device with characteristic dimensions of 10 cm (FIG. 19). The handheld device was then be used to manipulate various objects with different weight, size, curvature, and texture. Two SHPs made of VPS and Ecoflex-30 have been used in these demonstrations. In another embodiment, the invention may employ a bottom membrane sealing a first end of the cylindrical sidewall, with or without an extra cap, i.e., there is a membrane diameter bigger than the hollow pillar diameter, as seen in FIG. 15. In yet a further embodiment, pillars according to the invention may have a non-cylindrical sidewall, such as elliptical, square, or rectangular cross sections/contact geometries as seen in FIG. 16.

Example 2

In this example, through a combination of experiments and simulations, the effect of contact geometry on tunable dry adhesion of pressure-activated soft hollow pillars was studied. Specifically, elliptical, square, and rectangular contact shapes were considered and their effects on tunable adhesion of the soft hollow pillars are compared to that of circular contact geometry thoroughly. The results show that soft hollow pillars with elliptical, square and rectangular contact surfaces demonstrate rich interfacial delamination behaviors that depend on the contact outline geometry and internal pressure. Among all contact geometries, elliptical contact has the highest adhesion tunability yet requires lowest activating pressure owing to the non-uniform curvature distribution of the contact outline. However, when the eccentricity increases, the elliptical contact has reduced tunability of adhesion caused by the contact of opposing sides of the sidewall upon buckling. For square and rectangular contacts, they have the lowest adhesion tunability and need higher activating pressure than those of circular and elliptical contact since the 90-degree edges of the sidewall prohibit buckling instability. These findings greatly broaden the design space of pneumatics-activated adhesive devices by adding the contact geometry of the soft hollow pillars as a new design parameter, which can provide valuable guidance to tunable adhesive design for various applications in manufacturing and robotics.

The contour of contact is dictated by the shape of the contact membrane, which can be circular, elliptical, square, or rectangular, as illustrated in FIG. 16(b). The circular contact membrane has a diameter represented by d, while the elliptical contact membrane is defined by the semi-major axis, a, and the semi-minor axis, b. In the case of a square or rectangular contact membrane, its length and width are denoted by l and w, respectively. Through a combination of experiments and finite element simulations, we examine the adhesion strength and interfacial delamination behavior of these SHPs as the internal pressure changes. The results show that SHPs with all contact geometries exhibit rich interfacial delamination behaviors as the interfacial delamination initiation location shifts as pressure changes (FIG. 16(b)). In general, for all contact geometries, the delamination can start from the contact edge or inside the contact area depending on the applied internal pressure. Particularly, for circular or elliptical contacts, delamination can be induced by buckling instability when internal pressure is negative with large enough magnitude. However, such a behavior is absent in square or rectangular contacts. For edge delamination, the initiation location can be the vertexes or the co-vertexes in elliptical contacts, and the corners or the midpoints of straight edges in square and rectangular contacts. When internal pressure is positive and large enough, SHPs with all contact geometries develop internal delamination. Regarding tunable adhesion performance, it is found that the elliptical contact geometry with small eccentricity has the optimal performance including the highest adhesion tunability (~182×), the lowest activating pressure (~8 kPa) and well-controlled buckling directions.

The adhesion properties of the SHP against a flat substrate are influenced by its geometric parameters, as exemplified in the circular contact scenario of EXAMPLE 1. Consequently, to investigate the effect of the contact outline's shape on adhesion performance, all scenarios in this study maintain consistent values for the dimensional parameters: the SHP has a fixed height of h=6 mm, sidewall thickness $t_s$=0.8 mm, bottom membrane thickness $t_b$=0.8 mm, and top membrane thickness of $t_p$=2 mm. Furthermore, considering that the tensile force is primarily carried by the sidewall when the contact membrane adheres to the substrate, it is crucial to maintain consistency in the projected area of the sidewall on the contact plane. This area can be approximated by the product of the sidewall thickness, $t_s$, and the circumference, c, of the contact membrane. Therefore, to eliminate its influence on the experimental outcomes, all samples in this example are designed to have an identical circumference, denoted as c≈18.8 mm.

The SHPs used in this example were made of polymers vinylpolysiloxane (VPS, Elite Double 8, Zhermack) fabricated through the mold casting method. The mold's geometry is precisely controlled through 3D printing (Objet30 Prime, Stratasys). To minimize roughness and ensure optimal contact with a flat target surface, the curing process involves pressing the contact membrane of the SHPs against a glass piece with a smooth surface, as depicted in FIG. 17(a). Once the SHP is successfully fabricated, it is affixed to a 3D printed fixture using uncured VPS as glue. The fixture is then firmly attached to an Instron Miro-Tester (Model 68SC1) that controls the movement of the SHP and measures the interactive force with the substrate (FIG. 17(b)). The Instron machine is equipped with a load cell featuring a measurement precision of 1 mN and a capacity of 5 N.

To quantify the dry adhesion between the SHP and a flat glass substrate, a specific experimental procedure is followed. The SHP first approaches the substrate with a constant velocity of 1 mm/min. The motion stops when the compressive force between the SHP and the glass substrate reaches 200 mN. This force threshold is chosen to ensure proper contact between the contact membrane and the glass substrate, as supported by EXAMPLE 1. Once the contact is established, the SHP remains stationary for two minutes. During this period, the internal pressure p is adjusted to the desired value, which is measured using a digital manometer (range ~70 kPa, resolution 0.01 kPa). Positive pressure is applied using a pressure source, while negative pressure is controlled through a syringe. Following the stationary period, the SHP retracts from the glass substrate at a constant speed of 0.2 mm/min until complete detachment is achieved. Throughout the retraction process, the internal pressure p is kept constant. The Instron machine records both the location of the SHP, denoted as z, and the interactive force with the substrate, represented as F during the entire test. The variable z is set as zero when the SHP first contacts the substrate, and the force F is positive (negative) when the interaction between the SHP and the substrate is compressive (attractive) (FIG. 17(b)). The pull-off force $F_p$, used as a measure of adhesion strength, is determined as the maximum attractive force observed during the retraction process. Accordingly, the pull-off strength $\sigma_p$ is defined as the pull-off force $F_p$ divided by the total area of the contact membrane. At least three measurements are conducted for adhesion strengths at each internal pressure level. Both the average and the standard deviation of the pull-off force are reported. In addition to tracking the force-displacement relationship, the contact area between SHP and the substrate during the separation is monitored using two LED lights positioned at the lateral sides of the substrate. The phenomenon of light scattering allows the adhered area to appear bright, while the detached area appears dark. This technique enables the visualization and analysis of the formation and propagation of interfacial delamination during the experiment. To calculate the switching ratio and activating pressure under both positive and negative pressure regimes, the pull-off strength without pressure (p=0 kPa) is used as the highest adhesive strength, and the plateau value of the adhesion strength under large enough pressure magnitude is used as the lowest adhesion strength. Moreover, the activating pressure is taken as the lowest pressure magnitude beyond which adhesion strength plateaus.

Following is a summary and comparison of the tunable adhesion performance of SHPs with circular, elliptical, square, and rectangular contact geometries investigated in this study. The aim is to identify the best candidate that can effectively achieve reversible dry adhesion. The analysis mainly focuses on key tunable adhesion performance metrics including adhesion strength, switching ratio, and activating pressure, as these metrics are essential for various applications, including tasks such as pick-and-place operations (Table 2). To ensure consistency, the adhesion strength value at zero internal pressure (p=0 kPa) was selected to evaluate the adhesion strengths of the SHPs with various contact geometries. All data is based on experimental measurement.

TABLE 2

Adhesion strength $\sigma_p$ (p = 0 kPa), switching ratio and activating pressure of circular, elliptical, square, and rectangular contact geometry.

| Contact Geometry | $\sigma_p$ (kPa, p = 0 kPa) | Switching Ratio (p < 0 kPa) | Activating Pressure (kPa, p < 0 kPa) | Switching Ratio (p > 0 kPa) | Activating Pressure (kPa, p > 0 kPa) |
|---|---|---|---|---|---|
| Circular | 4.66 | 131× | 10 | 131× | 20 |
| Elliptical (e = 0.64) | 6.55 | 182× | 8 | 182× | 26 |
| Elliptical (e = 0.87) | 5.54 | 10× | 6 | 129× | 24 |
| Square (l/w = 1) | 4.53 | 5× | 12 | 100× | 24 |
| Rectangular (l/w = 1.3) | 6.63 | 6× | 10 | 143× | 28 |

As summarized in Table 2, it becomes evident that the choice of contact geometry for the SHPs exerts minimal influence on the adhesion strength when the sidewall thickness t and contact circumference c are held constant. Across all considered contact geometries, SHPs exhibit a relatively uniform adhesion strength $\sigma_p$ of approximately 5 kPa (4.66-6.63 kPa). Upon the application of positive pressure, SHPs of different contact geometries achieve adhesion switching ratios spanning two orders of magnitude. However, the required activating pressure magnitude is substantially higher compared to the negative pressure scenario (~10 kPa vs. ~20 kPa). In addition, under negative pressure only circular or elliptical contacts with low eccentricity (e.g., e=0.64) can achieve switching ratios of two orders of magnitude, capitalizing on buckling instability. However, for SHPs with elliptical contacts with larger eccentricities (e.g., e=0.87), the presence of self-contact in their sidewalls upon buckling hampers their efficacy in reducing adhesion strength, and thus leading to much lower adhesion switching ratios. For SHPs with square and rectangular contacts, the absence of sidewall buckling instability due to the 90-degree sharp edges contributes to their limited adhesion switching ratio under negative pressure.

The above analysis based on data summarized in Table 2 underscores the superiority of circular and elliptical (with small eccentricity) contact geometries for SHP design, given their impressive combination of a high adhesion switching ratio and a low activating pressure. However, it is worth emphasizing that the introduction of eccentricity to the contact geometry offers an additional advantage, namely, the ability to control sidewall buckling direction under negative pressure. For a SHP with elliptical contact, buckling dimples are always formed at its co-vertexes. In contrast, for a circular SHP, the formation of buckling dimples is sensitive to the random defects introduced by the manufacturing process or misalignment during adhesion pull-off, and thereby is also random. This aspect gains particular significance when multiple SHPs are organized into patterns.

For instance, FEM simulations were conducted to study the scenario of four circular SHPs arranged in a 2×2 pattern. Each SHP has dimensions of d=6 mm, h=6 mm, $t_s=t_b=0.8$ mm, $t_p=2$ mm. The distance between centers of adjacent SHPs is set to be 9 mm. Under negative pressure (p=−10 kPa), these circular SHPs undergo sidewall buckling, and intriguingly, the buckling directions of adjacent SHPs are perpendicular to each other (FIG. 18(a)). The underlying reason is that the buckling dimple in a circular SHP generates a region with high stress in the top membrane. If two neighboring circular SHPs have identical buckling directions, these high-stress regions will intersect, leading to much increased elastic energy of the system. Consequently, a configuration where the adjacent dimples avert facing each other evolves as the preferred state, thereby resulting in non-uniform buckling directions for the assembled circular SHPs. However, for SHPs with elliptical contact geometries under the same negative pressure (p=−10 kPa), their assembly exhibits a uniform buckling direction. This uniformity can be attributed to the predetermined locations of buckling dimples at the co-vertexes of the elliptical contacts (FIG. 18(b)). While it is true that two adjacent dimples face each other in this scenario, it is still energetically favorable for the assembled system of SHPs. This uniformity in buckling direction could offer distinct advantages in applications such as large-scale, parallel pick-and-place operations, as it ensures that the interfacial crack initiation site remains consistent for each object, potentially streamlining and optimizing the process.

Another important observation to note is that an elliptical SHP needs roughly the same activating pressure as that of a circular SHP under internal negative pressure. This is in contrast with the fact that the buckling pressure $p_{cr}$ of an elliptical SHP (~4 kPa) is much lower than that of a circular SHP (~10 kPa). Despite the lower pressure required for an elliptical SHP to initiate sidewall buckling, the resulting elastic force generated by the contact membrane at this initiating pressure is insufficient to detach it from the substrate. Therefore, the application of a much larger pressure magnitude than its initial buckling pressure becomes necessary to achieve a substantial reduction in adhesion strength.

The present invention, through a combination of experiments and finite element modelling, examines the adhesive behaviors of SHPs with various contact geometries including circular, elliptical, square, and rectangular. The findings reveal that, for SHPs with identical sidewall thickness and contact circumference, the adhesion strength remains relatively consistent across different contact geometries. Under positive pressure, SHPs with all contact geometries exhibit a switching ratio of two orders of magnitude, although the activating pressure required is higher than that under negative pressure. Under negative pressure, SHPs with circular and elliptical contact geometries demonstrate switching ratios with two orders of magnitude, owing to the sidewall buckling instability. However, as the eccentricity of the elliptical contact geometry increases, the switching ratio diminishes because of the self-contact of the buckling dimples. Conversely, SHPs with square or rectangular contact geometry exhibit limited adhesion switching ratio under negative pressure due to the absence of buckling instability. A comparative analysis between circular and elliptical (small eccentricity) contact geometries reveals similar adhesion strength, activating pressure, and switching ratio. However, an interesting advantage becomes apparent when considering elliptical geometry for patterned assemblies of SHPs. Unlike circular SHPs, elliptical SHPs exhibit uniform buckling direction when arranged in patterns. This feature could prove advantageous for large-scale pick-and-place operations.

By unravelling the intricate nonlinear effects of sidewall and contact membrane deformations of SHPs with various contact geometries under internal pressure, the present invention enriches the design possibilities of SHPs. Furthermore, the insights gained herein could catalyze advancements in related domains such as transfer printing, robotic locomotion, and manipulation, where the choice of contact geometry can wield substantial influence. In sum, the present invention contributes profoundly to the evolving landscape of soft adhesive structures and their practical applications.

What is claimed is:

1. A tunable dry adhesion apparatus, comprising:
   a sidewall extending along a predetermined cross-sectional geometry to define a pillar having a hollow space extending fully across the predetermined cross-sectional geometry of the pillar;
   a bottom membrane sealing a first end of the hollow space of the pillar; and
   a source of pressure coupled to an opposing end of the sidewall from the bottom membrane that is configured to selectively apply or remove pressure from the hollow space;
   wherein the bottom membrane has a first adhesion strength at a first amount of pressure in the hollow space such that the pillar will adhere to a target object and a second adhesion strength that is lower than the first adhesion strength at a second amount of pressure in the hollow space that is different than the first amount of pressure such that the pillar will release the target object; and
   wherein the second amount of pressure is higher than the first amount of pressure when the first amount of pressure is a positive pressure, the second amount of pressure is lower than the first amount of pressure when the first amount of pressure is a negative pressure, and the second amount of pressure is either one of a positive or a negative pressure if the first amount of pressure is zero pressure.

2. The apparatus of claim 1, wherein the sidewall and the bottom membrane are formed from a silicone elastomer.

3. The apparatus of claim 2, wherein the elastomer is a material selected from the group consisting of vinylpolysiloxane and silicone rubber.

4. The apparatus of claim 1, wherein the bottom membrane extends beyond the sidewall.

5. The apparatus of claim 1, wherein the predetermined cross-sectional geometry comprises a circle.

6. The apparatus of claim 5, wherein the diameter of the circle is between 4 and 8 millimeters, inclusively, the sidewall has a thickness of between 0.6 and 1.2 millimeters, inclusively, and the sidewall has a height of between 9 and 9.8 millimeters, inclusively.

7. The apparatus of claim 1, wherein the predetermined cross-sectional geometry comprises an ellipse.

8. The apparatus of claim 7, wherein the ellipse has an elliptical ratio of between 0.3 and 1.0, inclusively.

9. A method of adhering to a target object, comprising the steps of:
   providing a dry adhesion apparatus having a sidewall extending along a predetermined cross-sectional geometry to define a pillar having a hollow space extending fully across the predetermined cross-sectional geometry of the pillar, a bottom membrane sealing a first end of the hollow space of the pillar, and a source of pressure coupled to an opposing end of the sidewall from the bottom membrane that is configured to selectively apply or remove pressure from the hollow space, wherein the bottom membrane has a first adhesion strength at a first amount of pressure in the hollow space such that the pillar will adhere to the target object and a second adhesion strength that is lower than the first adhesion strength at a second amount of pressure in the hollow space that is different than the first amount of pressure such that the pillar will release the target object;
   moving the dry adhesion apparatus so that the bottom membrane contacts the target object;
   attaching the dry adhesion apparatus to the target object with a first amount of pressure in the hollow space; and
   releasing the target object by applying the second amount of pressure to the hollow space, wherein the second amount of pressure is higher than the first amount of pressure when the first amount of pressure is a positive pressure, the second amount of pressure is lower than the first amount of pressure when the first amount of pressure is a negative pressure, and the second amount of pressure is either one of a positive or a negative pressure if the first amount of pressure is zero pressure.

10. The method of claim 9, wherein the first amount of pressure comprises a positive pressure.

11. The method of claim 10, wherein the first amount of pressure comprises a negative pressure.

12. The method of claim 9, wherein the sidewall and the bottom membrane are formed from a silicone elastomer.

13. The method of claim 9, wherein the elastomer is a material selected from the group consisting of vinylpolysiloxane and silicone rubber.

14. The method of claim 9, wherein the bottom membrane extends beyond the sidewall.

15. The method of claim 9, wherein the predetermined cross-sectional geometry comprises a circle.

16. The method of claim 15, wherein the diameter of the circle is between 4 and 8 millimeters, inclusively, the sidewall has a thickness of between 0.6 and 1.2 millimeters, inclusively, and the sidewall has a height of between 9 and 9.8 millimeters, inclusively.

17. The method of claim 9, wherein the predetermined cross-sectional geometry comprises an ellipse.

18. The method of claim 17, wherein the ellipse has an elliptical ratio of between 0.6 and 0.8, inclusively.

* * * * *